(12) United States Patent
Iwai et al.

(10) Patent No.: US 10,875,355 B2
(45) Date of Patent: Dec. 29, 2020

(54) BICYCLE COMPONENT AND BICYCLE RIM

(71) Applicant: SHIMANO INC., Sakai (JP)

(72) Inventors: Toru Iwai, Sakai (JP); Tetsu Nonoshita, Sakai (JP); Toyoshi Yoshida, Sakai (JP)

(73) Assignee: SHIMANO INC., Sakai (JP)

( * ) Notice: Subject to any disclaimer, the term of this patent is extended or adjusted under 35 U.S.C. 154(b) by 261 days.

(21) Appl. No.: 15/857,475

(22) Filed: Dec. 28, 2017

(65) Prior Publication Data
US 2019/0202233 A1    Jul. 4, 2019

(51) Int. Cl.
| | |
|---|---|
| B60B 1/00 | (2006.01) |
| B60B 25/02 | (2006.01) |
| B60B 21/06 | (2006.01) |
| B60B 25/00 | (2006.01) |
| B60B 7/00 | (2006.01) |
| B60B 7/01 | (2006.01) |
| B60B 25/22 | (2006.01) |
| B60B 21/02 | (2006.01) |
| B60B 5/02 | (2006.01) |

(52) U.S. Cl.
CPC ............ B60B 1/003 (2013.01); B60B 7/0006 (2013.01); B60B 7/01 (2013.01); B60B 21/02 (2013.01); B60B 21/06 (2013.01); B60B 21/062 (2013.01); B60B 25/002 (2013.01); B60B 25/02 (2013.01); B60B 25/22 (2013.01); *B60B 5/02* (2013.01)

(58) Field of Classification Search
CPC ......... B60B 1/003; B60B 21/02; B60B 25/22; B60B 7/01; B60B 21/062; B60B 7/0006; B60B 25/002; B60B 21/06; B60B 25/02; B60B 5/02

USPC ..................................................... 301/95.102
See application file for complete search history.

(56) References Cited

U.S. PATENT DOCUMENTS

| | | | | |
|---|---|---|---|---|
| 6,398,313 | B1* | 6/2002 | Lew ......................... | B60B 1/003 301/100 |
| 7,883,157 | B2* | 2/2011 | Theilig ................... | B29C 70/84 301/64.704 |
| 9,688,338 | B2* | 6/2017 | Chuang .................... | B62K 3/02 |
| 2002/0153828 | A1* | 10/2002 | Yamanobe ................ | H01J 1/30 313/495 |
| 2005/0017569 | A1* | 1/2005 | Passarotto ............... | B60B 1/003 301/58 |
| 2010/0206989 | A1 | 8/2010 | Roming et al. | |
| 2011/0008646 | A1* | 1/2011 | Cahalen .................. | C23C 28/00 428/655 |
| 2011/0089751 | A1* | 4/2011 | Saillet ....................... | B60B 5/02 301/95.103 |
| 2011/0193402 | A1* | 8/2011 | Yamamoto ................ | B60B 1/02 301/56 |

(Continued)

FOREIGN PATENT DOCUMENTS

| | | |
|---|---|---|
| DE | 840660 B | 6/1952 |
| DE | 102004047264 | 4/2006 |

(Continued)

*Primary Examiner* — S. Joseph Morano
*Assistant Examiner* — Jean W Charleston
(74) *Attorney, Agent, or Firm* — Mori & Ward, LLP

(57) ABSTRACT

A bicycle component comprises a first structural member made of a conducting material, an electrical insulation layer provided to the first structural member, and a second structural member configured to be attached to the electrical insulation layer by adhesive.

28 Claims, 39 Drawing Sheets

(56) References Cited

U.S. PATENT DOCUMENTS

| | | | | |
|---|---|---|---|---|
| 2013/0025597 | A1* | 1/2013 | Doyle | A61M 16/00 128/204.23 |
| 2014/0015307 | A1* | 1/2014 | Poertner | B60B 21/08 301/6.9 |
| 2014/0072799 | A1* | 3/2014 | Prentice | A63B 53/04 428/339 |
| 2014/0346849 | A1* | 11/2014 | Shiotani | B60B 21/00 301/95.102 |

FOREIGN PATENT DOCUMENTS

| | | |
|---|---|---|
| DE | 102007029337 | 1/2009 |
| DE | 102010034500 | 2/2012 |
| DE | 102012213455 | 5/2014 |
| JP | 2014-195910 | 10/2014 |

\* cited by examiner

BICYCLE COMPONENT AND BICYCLE RIM

BACKGROUND OF THE INVENTION

Field of the Invention

The present invention relates to a bicycle component and a bicycle rim.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

SUMMARY OF THE INVENTION

In accordance with a first aspect of the present invention, a bicycle component comprises a first structural member made of a conducting material, an electrical insulation layer provided to the first structural member, and a second structural member configured to be attached to the electrical insulation layer by adhesive.

With the bicycle component according to the first aspect, it is possible to apply an electric surface treatment to the first structural member.

In accordance with a second aspect of the present invention, the bicycle component according to the first aspect is configured so that the electrical insulation layer includes synthetic resin.

With the bicycle component according to the second aspect, it is possible to improve connection strength between the first structural member and the second structural member and improve corrosion resistance of the bicycle component.

In accordance with a third aspect of the present invention, the bicycle component according to the first or second aspect is configured so that the electrical insulation layer includes an electrodeposition coating layer.

With the bicycle component according to the third aspect, it is possible to substantially uniformly provide the electrical insulation layer to the first structural member.

In accordance with a fourth aspect of the present invention, the bicycle component according to any one of the first to third aspects is configured so that the first structural member includes a metallic material.

With the bicycle component according to the fourth aspect, it is possible to provide the bicycle component having greater rigidity.

In accordance with a fifth aspect of the present invention, the bicycle component according to the fourth aspect is configured so that the metallic material includes aluminum.

With the bicycle component according to the fifth aspect, it is possible to provide another layer on the first structural member if the electrical insulation layer is removed from an area other than an attaching area in which the second structural member is attached to the electrical insulation layer. This improves appearance of the bicycle component.

In accordance with a sixth aspect of the present invention, the bicycle component according to the fifth aspect is configured so that the first structural member includes an anodized oxide layer.

With the bicycle component according to the sixth aspect, it is possible to improve appearance and connection strength of the bicycle component.

In accordance with a seventh aspect of the present invention, the bicycle component according to any one of the first to sixth aspects is configured so that the second structural member includes a non-metallic material.

With the bicycle component according to the seventh aspect, it is possible to improve strength of the bicycle component while saving weight of the bicycle component.

In accordance with an eighth aspect of the present invention, the bicycle component according to the seventh aspect is configured so that the non-metallic material includes carbon fiber reinforced plastic.

With the bicycle component according to the eighth aspect, it is possible to improve strength of the bicycle component while saving weight of the bicycle component.

In accordance with a ninth aspect of the present invention, the bicycle component according to any one of the first to eighth aspects further comprises an additional electrical insulation layer provided to the second structural member. The electrical insulation layer of the first structural member is configured to be attached to the additional electrical insulation layer of the second structural member by adhesive.

With the bicycle component according to the ninth aspect, it is possible to improve connection strength between the first structural member and the second structural member and improve corrosion resistance of the bicycle component.

In accordance with a tenth aspect of the present invention, the bicycle component according to the ninth aspect is configured so that the second structural member is made of a conducting material.

With the bicycle component according to the tenth aspect, it is possible to apply electric surface treatment to the second structural member.

In accordance with an eleventh aspect of the present invention, the bicycle component according to any one of the first to tenth aspects is configured so that the bicycle component includes a bicycle rim.

With the bicycle component according to the eleventh aspect, it is possible to improve connection strength between the first structural member and the second structural member in a bicycle rim and improve corrosion resistance of the bicycle rim.

In accordance with a twelfth aspect of the present invention, a bicycle rim comprises a cover member made of a conducting material, an electrical insulation layer provided to the cover member, and a base member configured to be attached to the electrical insulation layer by adhesive. Any one of the first to eleventh aspects can be combined with the twelfth aspect.

With the bicycle rim according to the twelfth aspect, it is possible to apply electric surface treatment to the cover member of the bicycle rim.

In accordance with a thirteenth aspect of the present invention, the bicycle rim according to the twelfth aspect is configured so that the electrical insulation layer includes synthetic resin.

With the bicycle rim according to the thirteenth aspect, it is possible to improve connection strength between the cover member and the base member and improve corrosion resistance of the bicycle rim.

In accordance with a fourteenth aspect of the present invention, the bicycle rim according to the twelfth or thirteenth aspect is configured so that the electrical insulation layer includes an electrodeposition coating layer.

With the bicycle rim according to the fourteenth aspect, it is possible to substantially uniformly provide the electrical insulation layer to the cover member.

In accordance with a fifteenth aspect of the present invention, the bicycle rim according to any one of the twelfth to fourteenth aspects further comprises a spoke attachment member that is a separate member from the base member and the cover member.

With the bicycle rim according to the fifth aspect, it is possible to improve connection strength between the bicycle rim and a spoke.

In accordance with a sixteenth aspect of the present invention, the bicycle rim according to any one of the twelfth to fifteenth aspects is configured so that the cover member includes a metallic material.

With the bicycle rim according to the sixteenth aspect, it is possible to improve rigidity of a bicycle rim that has a bonded structure.

In accordance with a seventeenth aspect of the present invention, the bicycle rim according to the sixteenth aspect is configured so that the metallic material includes aluminum.

With the bicycle rim according to the seventeenth aspect, it is possible to provide another layer on the cover member if the electrical insulation layer is removed from an area other than an attaching area in which the base member is attached to the electrical insulation layer. This improves appearance of the bicycle rim.

In accordance with an eighteenth aspect of the present invention, the bicycle rim according to the seventeenth aspect is configured so that the cover member includes an anodized oxide layer.

With the bicycle rim according to the eighteenth aspect, it is possible to improve appearance and connection strength of the bicycle rim.

In accordance with a nineteenth aspect of the present invention, the bicycle rim according to any one of the twelfth to eighteenth aspects is configured so that the base member includes a non-metallic material.

With the bicycle rim according to the nineteenth aspect, it is possible to improve strength of the bicycle rim while saving weight of the bicycle rim.

In accordance with a twentieth aspect of the present invention, the bicycle rim according to the nineteenth aspect is configured so that the non-metallic material includes carbon fiber reinforced plastic.

With the bicycle rim according to the twentieth aspect, it is possible to improve strength of the bicycle rim while saving weight of the bicycle rim.

In accordance with a twenty-first aspect of the present invention, the bicycle rim according to any one of the twelfth to twentieth aspects is configured so that the base member includes a truss structure defining at least one opening. The cover member at least partly covers the at least one opening of the base member.

With the bicycle rim according to the twenty-first aspect, it is possible to further save weight of the bicycle rim.

In accordance with a twenty-second aspect of the present invention, the bicycle rim according to the twenty-first aspect is configured so that the truss structure includes at least one slanting member extending to intersect with a radial direction with respect to a rotational center axis of the bicycle rim.

With the bicycle rim according to the twenty-second aspect, it is possible to save weight of the bicycle rim and improve strength of the bicycle rim.

In accordance with a twenty-third aspect of the present invention, the bicycle rim according to the twenty-first or twenty-second aspect is configured so that the truss structure includes at least one radially extending member radially extending along a radial direction with respect to a rotational center axis of the bicycle rim.

With the bicycle rim according to the twenty-third aspect, it is possible to save weight of the bicycle rim and improve strength of the bicycle rim.

In accordance with a twenty-fourth aspect of the present invention, the bicycle rim according to the twenty-first aspect is configured so that the truss structure includes a plurality of slanting members extending to intersect with a radial direction with respect to a rotational center axis of the bicycle rim.

With the bicycle rim according to the twenty-fourth aspect, it is possible to save weight of the bicycle rim and improve strength of the bicycle rim.

In accordance with a twenty-fifth aspect of the present invention, the bicycle rim according to the twenty-first, twenty-second, or twenty-fourth aspect is configured so that the truss structure includes a plurality of radially extending members radially extending along a radial direction with respect to a rotational center axis of the bicycle rim.

With the bicycle rim according to the twenty-fifth aspect, it is possible to save weight of the bicycle rim and improve strength of the bicycle rim.

In accordance with a twenty-sixth aspect of the present invention, the bicycle rim according to any one of the twenty-first to twenty-fifth aspects is configured so that the truss structure defines a plurality of openings. The cover member at least partly covers the plurality of opening of the base member.

With the bicycle rim according to the twenty-sixth aspect, it is possible to further save weight of the bicycle rim.

In accordance with a twenty-seventh aspect of the present invention, the bicycle rim according to any one of the twenty-first to twenty-sixth aspects is configured so that the cover member entirely covers the at least one opening of the base member.

With the bicycle rim according to the twenty-seventh aspect, it is possible to improve appearance of the bicycle rim.

In accordance with a twenty-eighth aspect of the present invention, the bicycle rim according to the twenty-sixth aspect is configured so that the cover member entirely covers the plurality of openings of the base member.

With the bicycle rim according to the first aspect, it is possible to improve appearance of the bicycle rim.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
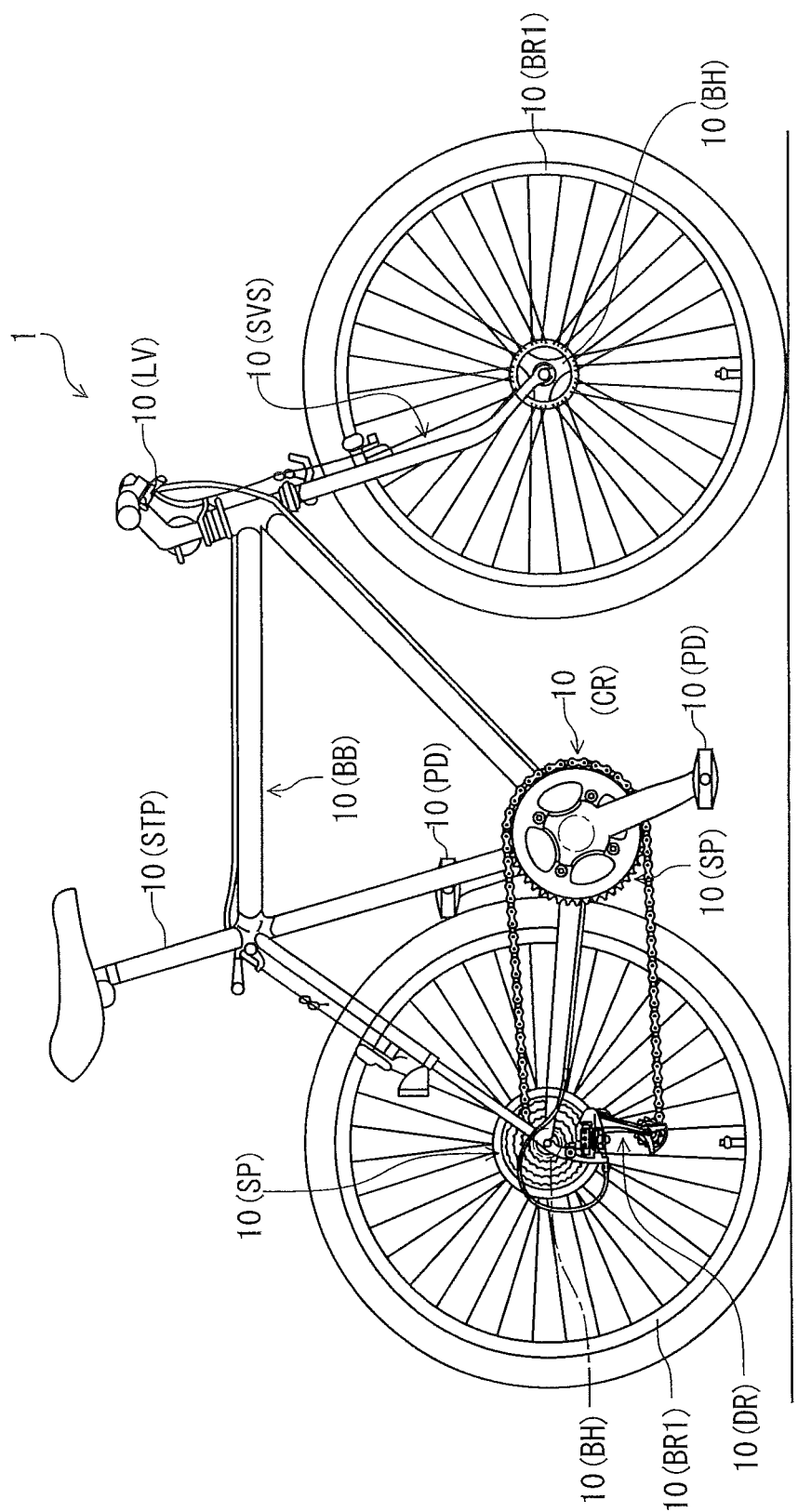
FIG. 1 is a side elevational view of a bicycle provided with a bicycle component in accordance with a first embodiment.

The embodiment(s) will now be described with reference to the accompanying drawings, wherein like reference numerals designate corresponding or identical elements throughout the various drawings.

First Embodiment

Figure 2:
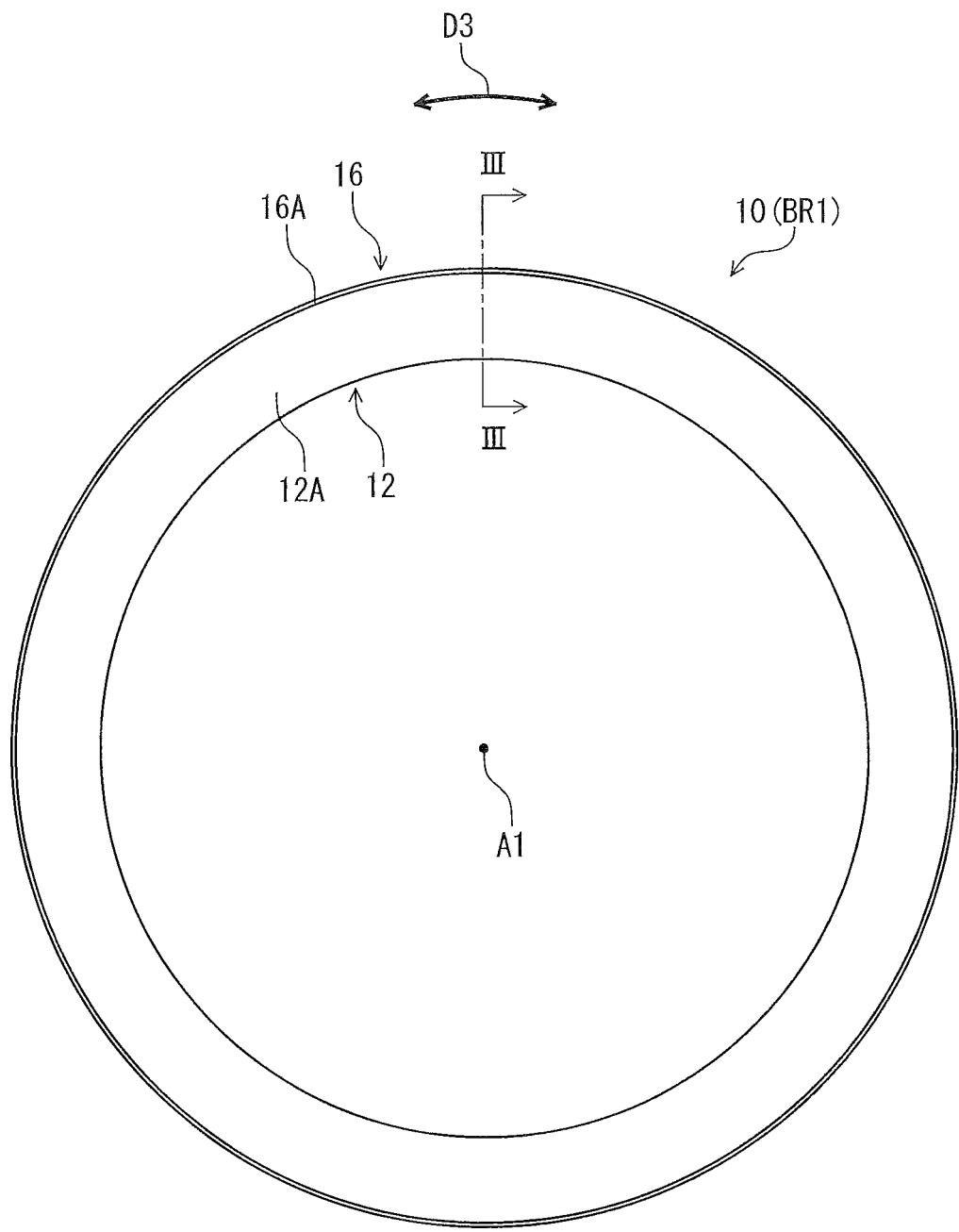
FIG. 2 is a side elevational view of the bicycle component including a bicycle rim in accordance with the first embodiment.

Referring initially to FIG. 1, a bicycle 1 includes a bicycle component 10 in accordance with a first embodiment. Examples of the bicycle component 10 includes a bicycle body BB, a suspension SUS, a seatpost STP, a bicycle rim BR1, a crank CR, a pedal PD, a sprocket SP, a lever LV, a derailleur DR, and a bicycle hub assembly BH. In this embodiment, as seen in FIG. 2, the bicycle component 10 includes a bicycle rim BR1. The bicycle rim BR1 has a rotational center axis A1.

Figure 3:
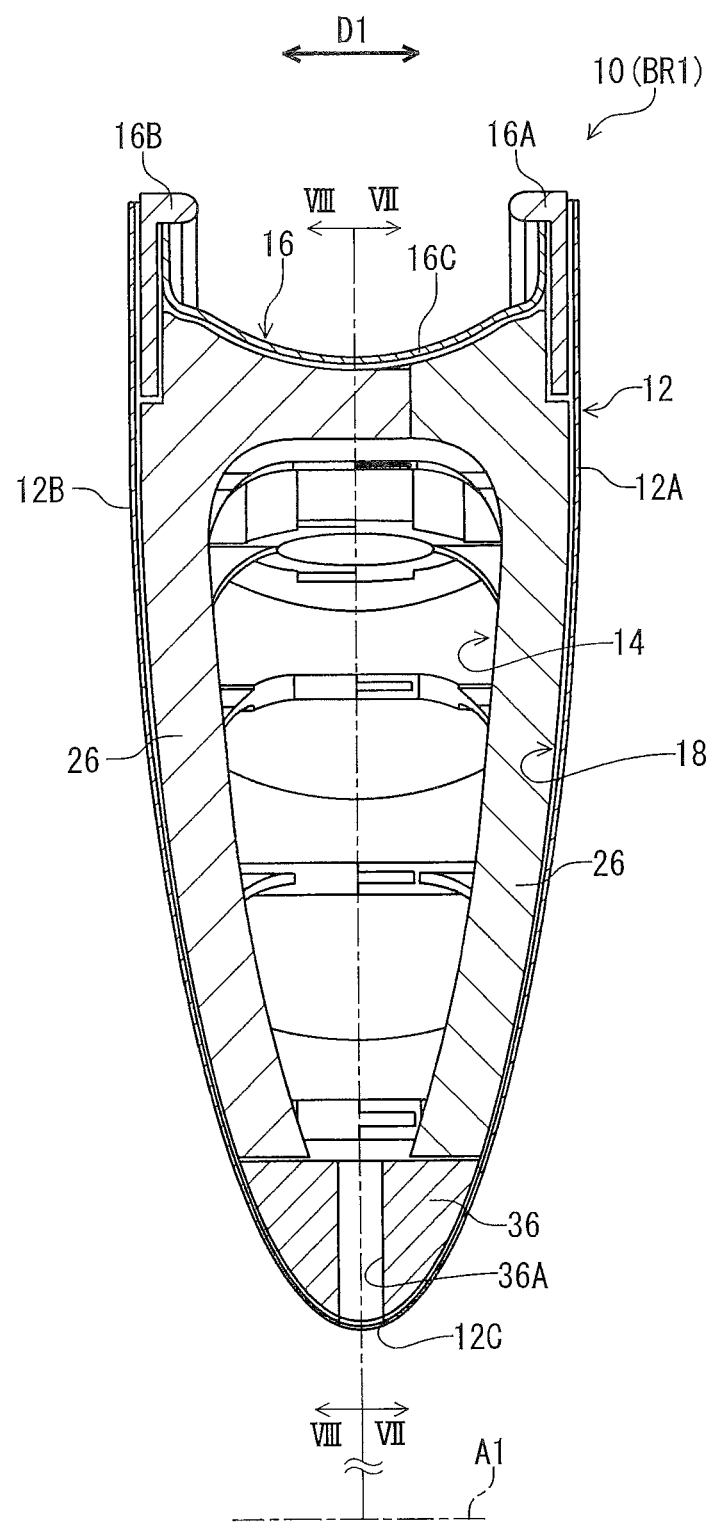
FIG. 3 is a cross-sectional view of the bicycle component taken along line of FIG. 2.

As seen in FIG. 3, the bicycle component 10 comprises a first structural member 12 and a second structural member 14. In a case where the bicycle component 10 includes a bicycle rim BR1, the first structural member 12 can also be referred to as a cover member 12. The second structural member 14 can also be referred to as a base member 14. Namely, the bicycle rim BR1 comprises the cover member 12 and the base member 14. The cover member 12 is different from a tire (not shown) made of rubber.

The first structural member 12 includes a first cover 12A and a second cover 12B. The first cover 12A is a separate member from the second cover 12B. However, the first cover 12A can be integrally provided with the second cover 12B as a one-piece unitary member. The first structural member 12 includes a plurality of through-holes 12C through which a spoke extends.

As seen in FIG. 3, the bicycle component 10 comprises a third structural member 16. The third structural member 16 is configured to be attached to the first structural member 12 and the second structural member 14. In this embodiment, the third structural member 16 can also be referred to as a tire-attachment member 16. The bicycle rim BR1 comprises the tire-attachment member 16. The tire-attachment member 16 includes a first tire-attachment part 16A, a second tire-attachment part 16B, and an intermediate part 16C. The first tire-attachment part 16A is configured to be attached to the first cover 12A. The second tire-attachment part 16B is configured to be attached to the second cover 12B. The intermediate part 16C is configured to be attached to the first tire-attachment part 16A and the second tire-attachment part 16B. In this embodiment, the intermediate part 16C is a separate member from the first tire-attachment part 16A and the second tire-attachment part 16B. However, the intermediate part 16C can be integrally provided with at least one of the first tire-attachment part 16A and the second tire-attachment part 16B as a one-piece unitary member.

The first structural member 12 and the third structural member 16 define an internal space 18. The second structural member 14 is provided in the internal space 18. As seen in FIG. 2, the first structural member 12 has an annular shape. The third structural member 16 has an annular shape. The internal space 18 has an annular shape. However, shapes of these elements are limited to this embodiment. For example, the bicycle rim BR1 is a clincher rim. However, the bicycle rim BR1 can be a tubular rim.

Figure 4:
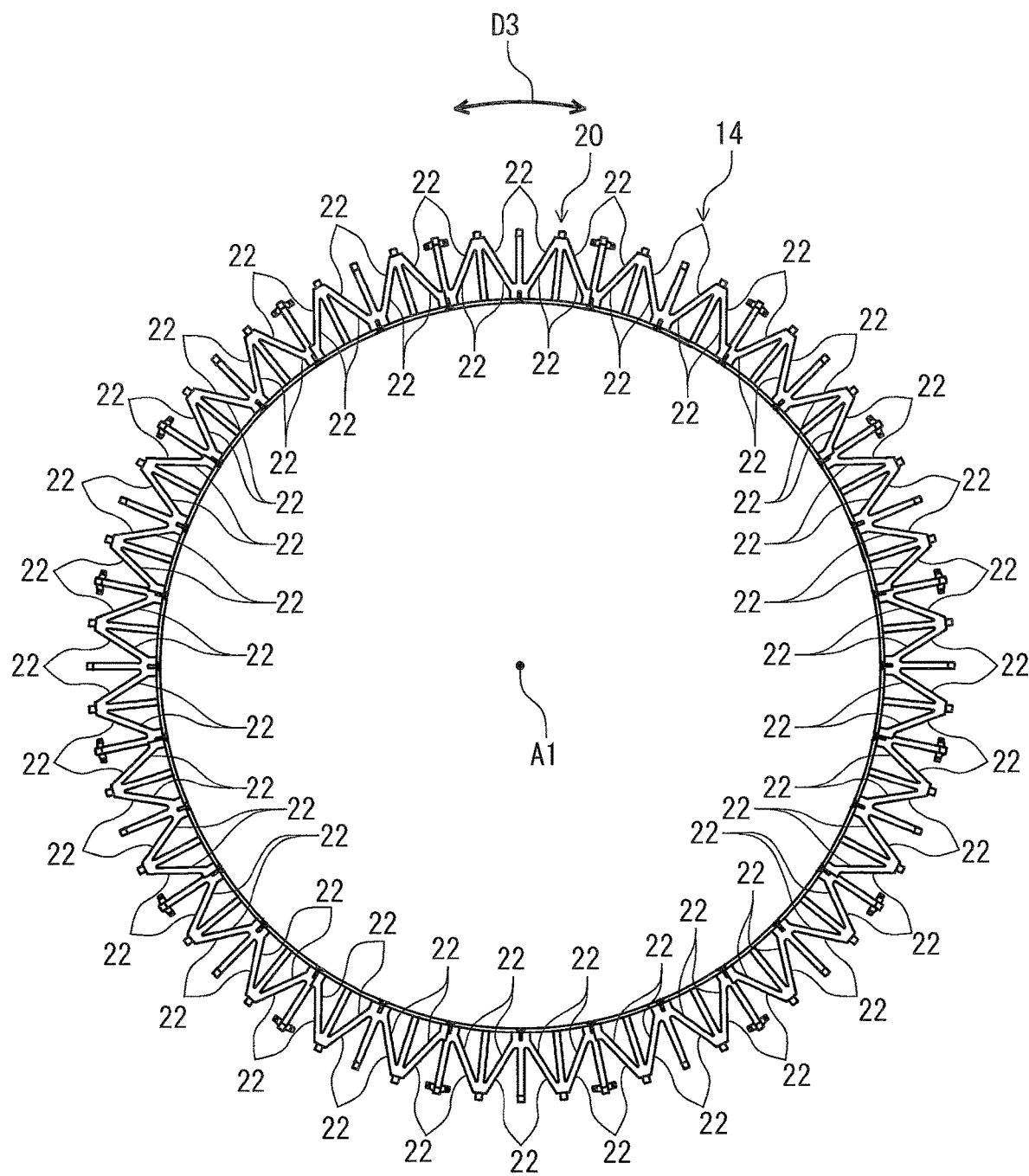
FIG. 4 is a side elevational view of a second structural member of the bicycle component illustrated in FIG. 2.

As seen in FIG. 4, the base member 14 includes a truss structure 20 defining at least one opening 22. In this embodiment, the truss structure 20 defines a plurality of openings 22. However, a total number of the openings is not limited to this embodiment.

Figure 5:
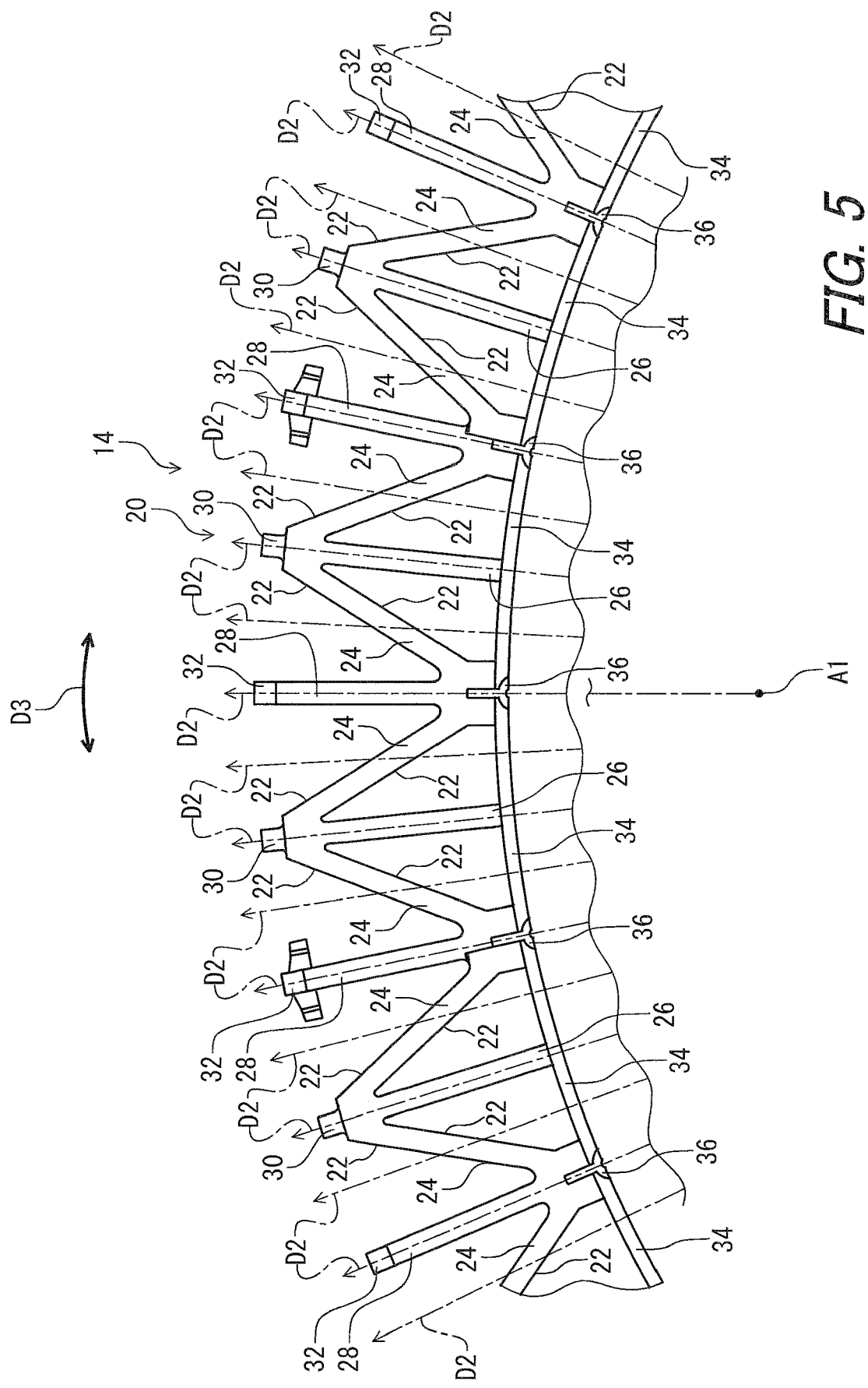
FIG. 5 is a partial side elevational view of the second structural member of the bicycle component illustrated in FIG. 2.

As seen in FIG. 5, the truss structure 20 includes at least one slanting member 24 extending to intersect with a radial direction D2 with respect to the rotational center axis A1 of the bicycle rim BR1. In this embodiment, the truss structure 20 includes a plurality of slanting members 24 extending to intersect with the radial direction D2 with respect to the rotational center axis A1 of the bicycle rim BR1. However, a total number of the slanting members 24 is not limited to this embodiment.

The truss structure 20 includes at least one radially extending member 26 radially extending along the radial direction D2 with respect to the rotational center axis A1 of the bicycle rim BR1. In this embodiment, the truss structure 20 includes a plurality of radially extending members 26 radially extending along the radial direction D2 with respect to the rotational center axis A1 of the bicycle rim BR1. However, a total number of the radially extending member 26 is not limited to this embodiment. The radially extending member 26 extends radially inwardly from the slanting member 24.

The truss structure 20 includes at least one radially extending member 28 radially extending along the radial direction D2 with respect to the rotational center axis A1 of the bicycle rim BR1. In this embodiment, the truss structure 20 includes a plurality of radially extending members 28 radially extending along the radial direction D2 with respect to the rotational center axis A1 of the bicycle rim BR1. However, a total number of the radially extending member 26 is not limited to this embodiment. The radially extending member 28 extends radially outwardly from the slanting member 24.

Figure 6:
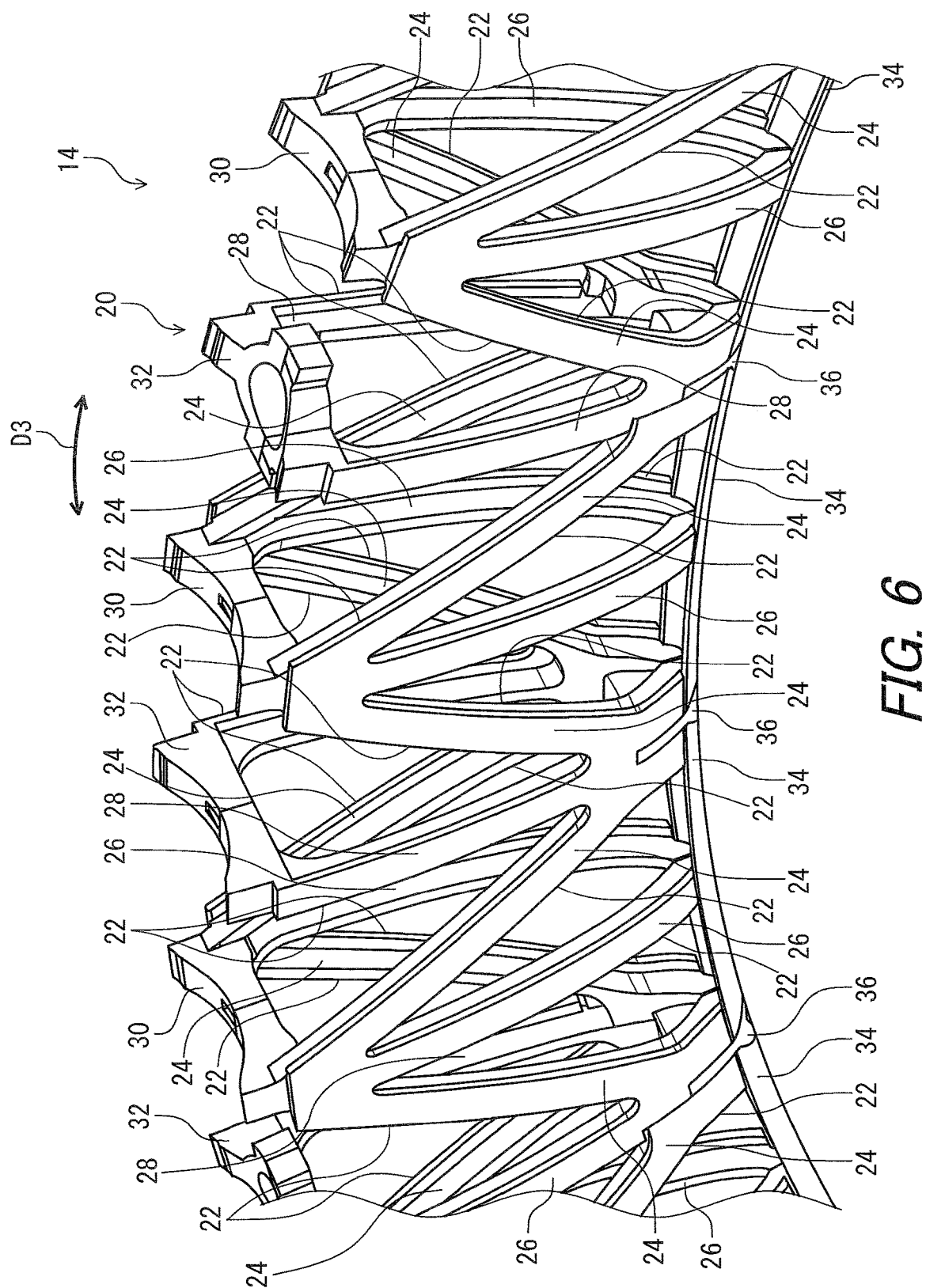
FIG. 6 is a partial perspective view of the second structural member of the bicycle component illustrated in FIG. 2.

As seen in FIG. 6, the truss structure 20 includes at least one coupling member 30. In this embodiment, the truss structure 20 includes a plurality of coupling members 30. However, a total number of the coupling members 30 is not limited to this embodiment. The coupling member 30 couples the at least one slanting member 24 and the at least one radially extending member 26. In this embodiment, the coupling member 30 couples four radially outer ends of the slanting members 24 and two radially outer ends of the radially extending members 26.

The truss structure 20 includes at least one additional coupling member 32. In this embodiment, the truss structure 20 includes a plurality of additional coupling members 32. However, a total number of the additional coupling members 32 is not limited to this embodiment. The additional coupling member 32 couples radially outer ends of the radially extending members 26.

The base member 14 includes at least one circumferentially extending member 34 attached to the truss structure 20. In this embodiment, the base member 14 includes a plurality of circumferentially extending members 34 attached to the truss structure 20. However, a total number of the circumferentially extending members 34 is not limited to this embodiment. The circumferentially extending member 34 couples the at least one slanting member 24 and the at least one radially extending member 26. In this embodiment, the additional coupling member 32 couples four radially inner ends of the slanting members 24 and two radially inner ends of the radially extending members 26. The slanting member 24, the radially extending member 26, and the circumferentially extending member 34 define the opening 22. The slanting member 24 and the radially extending member 28 define the opening 22.

Figure 7:
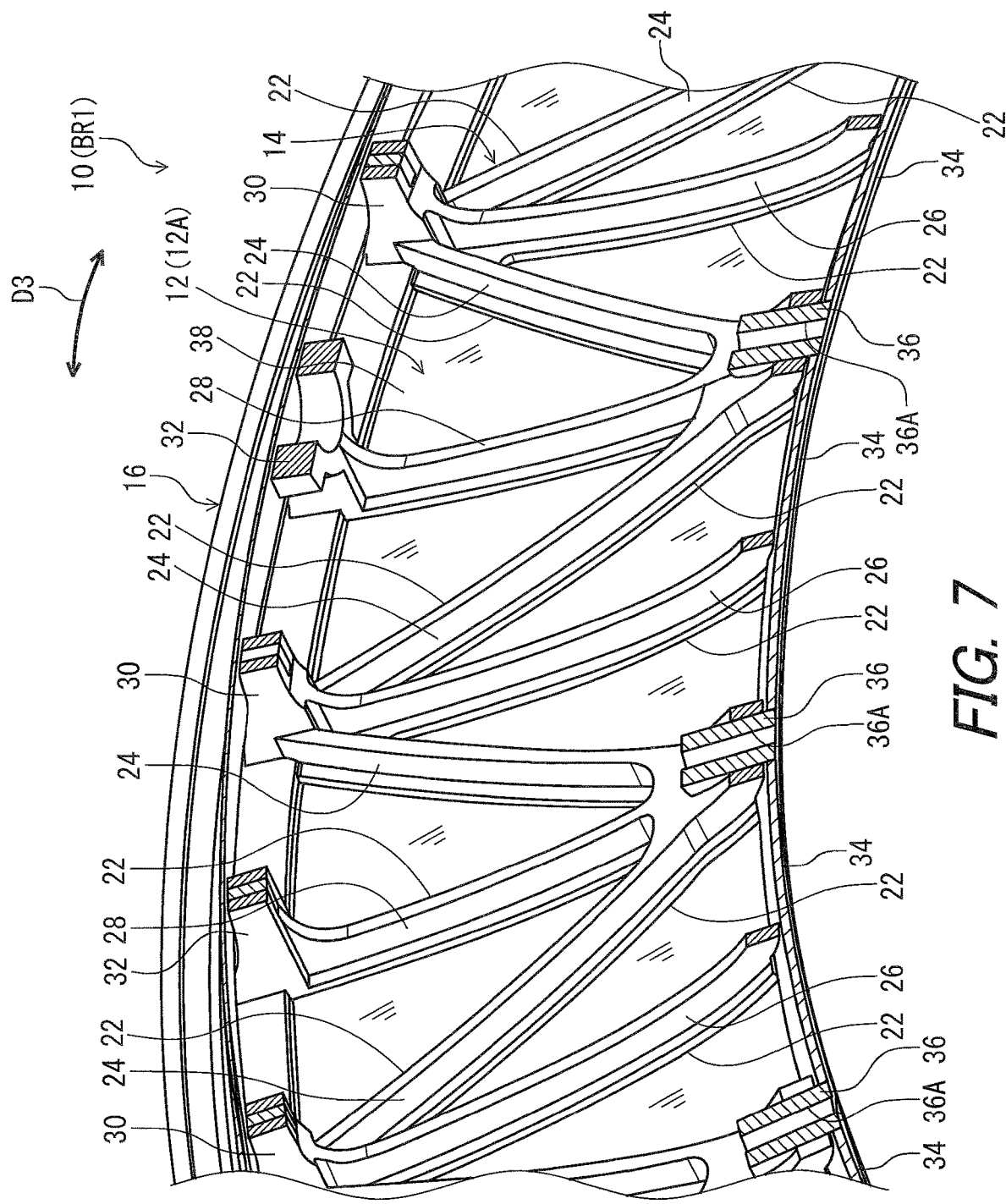
FIG. 7 is a partial perspective cross-sectional view of the bicycle component taken along with line VII-VII of FIG. 3.
Figure 8:
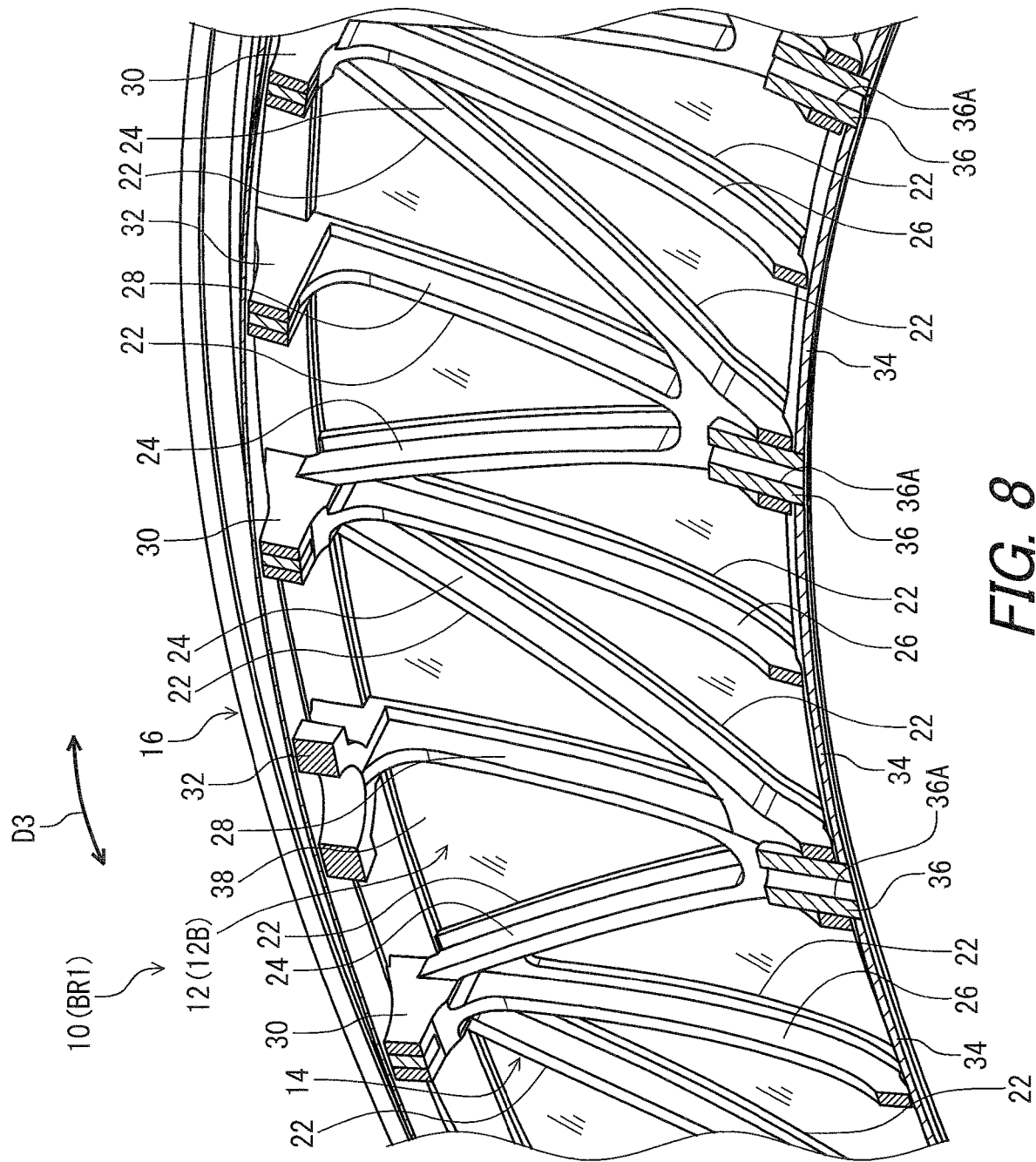
FIG. 8 is another partial perspective cross-sectional view of the bicycle component taken along with line VIII-VIII of FIG. 3.

As seen in FIG. 3, the bicycle rim BR1 further comprises a spoke attachment member 36 that is a separate member from the base member 14 and the cover member 12. The sprocket attachment member 36 includes a sprocket attachment hole 36A through which a spoke extends. As seen in FIGS. 7 and 8, in this embodiment, the bicycle rim BR1 comprises a plurality of spoke attachment member 36 that are separate members from the base member 14 and the cover member 12. However, a total number of the spoke attachment members 36 is not limited to this embodiment. The spoke attachment member 36 is attached to the base member 14 and is provided between adjacent two of the circumferentially extending members 34 in a circumferential direction D3. Preferably, the spoke attachment member 36 is made of a metallic material, such as aluminum, iron and titanium.

As seen in FIGS. 7 and 8, the cover member 12 at least partly covers the at least one opening 22 of the base member 14. The cover member 12 entirely covers the at least one opening 22 of the base member 14. The cover member 12 at least partly covers the plurality of opening 22 of the base member 14. The cover member 12 entirely covers the plurality of openings 22 of the base member 14. The opening 22 is at least partly provided radially outward of the spoke attachment member 36.

Figure 9:
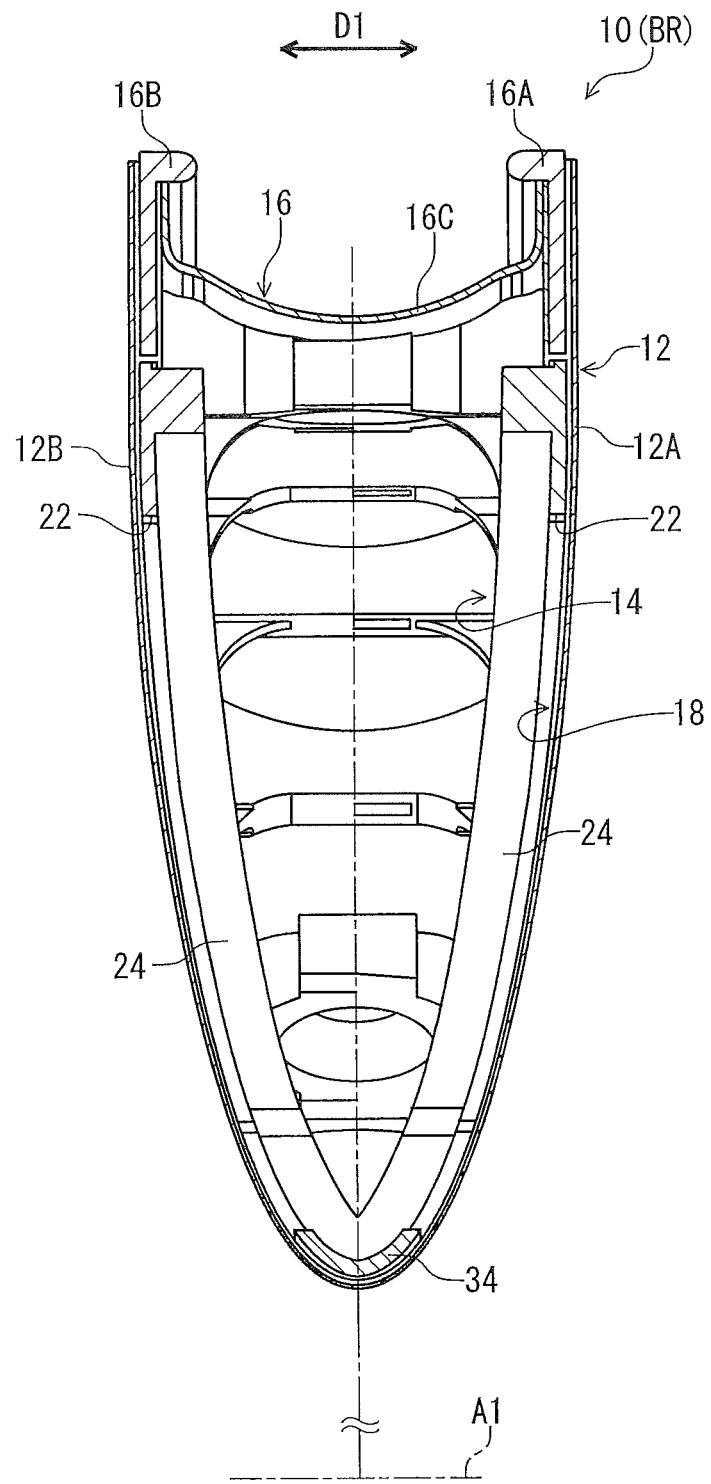
FIG. 9 is another cross-sectional view of the bicycle component illustrated in FIG. 2.

As seen in FIG. 9, the cover member 12 covers the opening 22 from an outside of the base member 14. The opening 22 is provided in the internal space 18 defined by the cover member 12 and the tire-attachment member 16.

Figure 10:
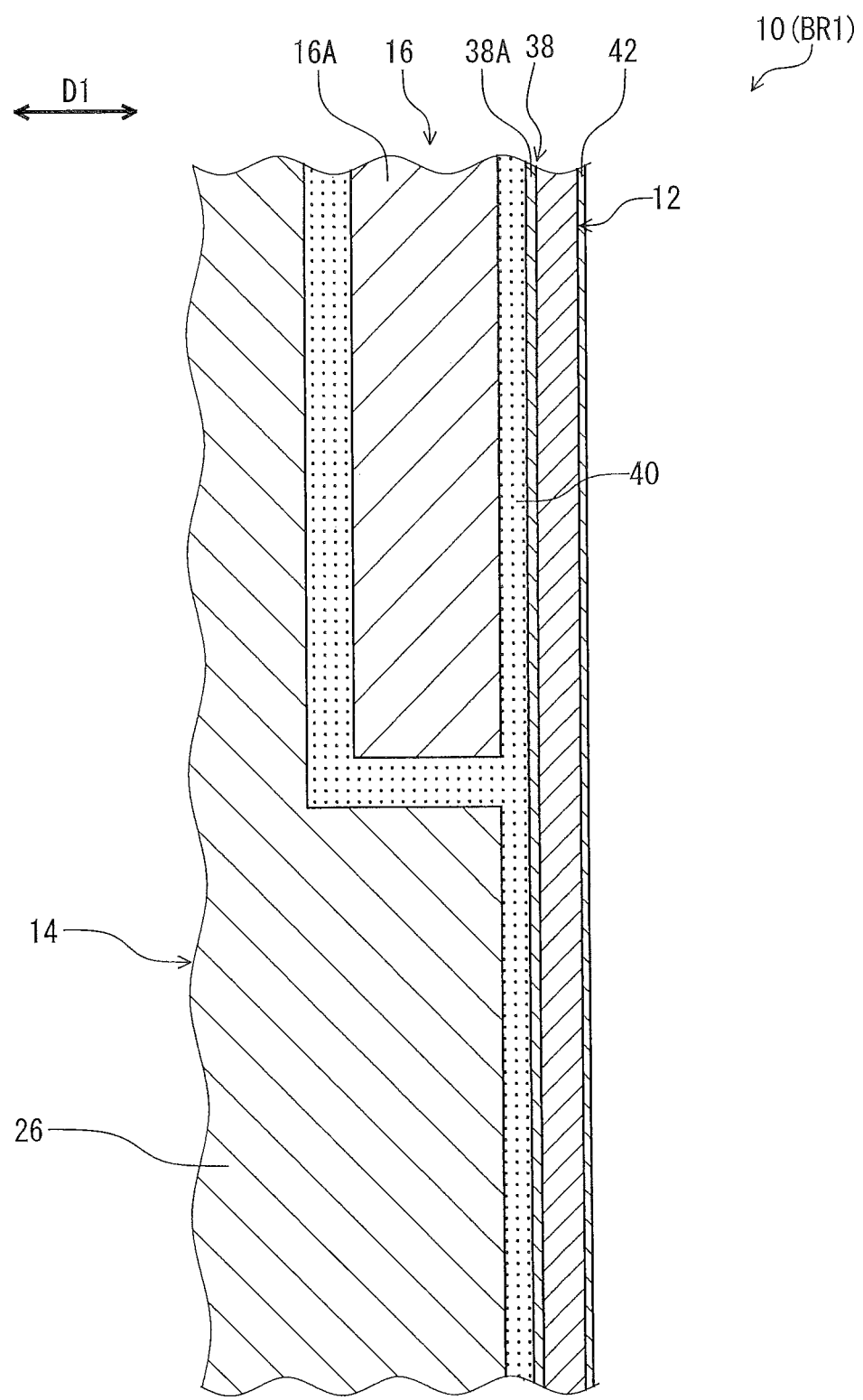
FIG. 10 is a partial enlarged cross-sectional view of the bicycle component illustrated in FIG. 2.

As seen in FIG. 10, the bicycle component 10 comprises an electrical insulation layer 38. The electrical insulation layer 38 is provided to the first structural member 12. The second structural member 14 is configured to be attached to the electrical insulation layer 38 by adhesive 40. The bicycle component 10 comprises the adhesive 40 between the second structural member 14 and the electrical insulation layer 38. In this embodiment, the bicycle rim BR1 comprises the electrical insulation layer 38. The electrical insulation layer 38 is provided to the cover member 12. The base member 14 is configured to be attached to the electrical insulation layer 38 by the adhesive 40. The bicycle rim BR1 comprises the adhesive 40 between the base member 14 and the electrical insulation layer 38.

In this embodiment, the first structural member (the cover member) 12 is made of a conducting material. The first structural member (the cover member) 12 include a metallic material. For example, the metallic material includes aluminum. However, the material of the first structural member (the cover member) 12 is not limited to this embodiment.

In this embodiment, the electrical insulation layer 38 includes an electrodeposition coating layer 38A. The electrical insulation layer 38 can include synthetic resin. The electrical insulation layer 38 (the electrodeposition coating layer 38A) is provided on the first structural member (the cover member) 12 with an electrodeposition coating process. However, the material of the electrical insulation layer 38 is not limited to this embodiment.

The second structural member (the base member) 14 includes a non-metallic material. For example, the non-metallic material includes carbon fiber reinforced plastic. However, the material of the second structural member (the base member) 14 is not limited to this embodiment.

As seen in FIG. 10, the first structural member (the cover member) 12 includes an anodized oxide layer 42. The anodized oxide layer 42 is provided on a reverse side of the electrical insulation layer 38 with respect to the first structural member 12. However, the anodized oxide layer 42 can be omitted from the bicycle component 10.

A method of manufacturing the bicycle component 10 will be described in detail below referring to FIGS. 11 to 15.

Figure 11:
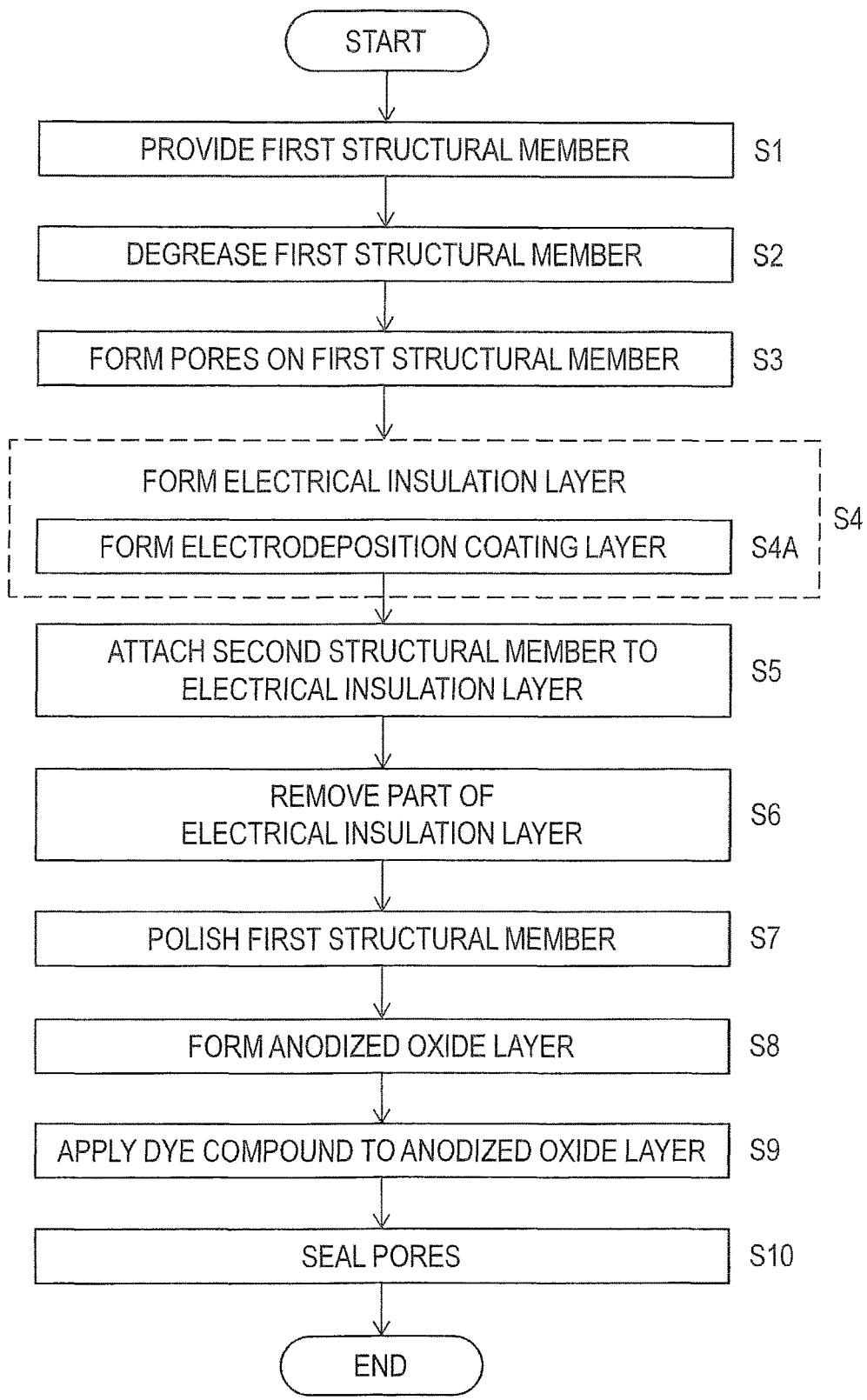
FIG. 11 is a flow chart of a method of manufacturing the bicycle component illustrated in FIG. 2.

As seen in FIG. 11, the method of manufacturing the bicycle component 10 comprises providing the first structural member 12 made of the metallic material such as aluminum (step S1). For example, the first structural member 12 is provided with one of casting, forging, and press working.

The method of manufacturing the bicycle component 10 comprises degreasing the first structural member 12 (step S2). For example, the degreasing of the first structural member 12 includes putting the first structural member 12 in a degreasing agent for approximately 1 minute under a temperature of approximately 60 degrees Celsius. The degreasing agent includes phosphate. The degreasing agent can include a surface acting agent in addition to phosphate.

The method of manufacturing the bicycle component 10 comprises forming pores (recesses) on the first structural member 12 (step S3). For example, the forming of the pores includes etching the first structural member 12 to from the pores on the first structural member 12. The forming of the pores can include applying laser to the first structural member 12 to form the pores instead of or in addition to the etching.

Figure 12:
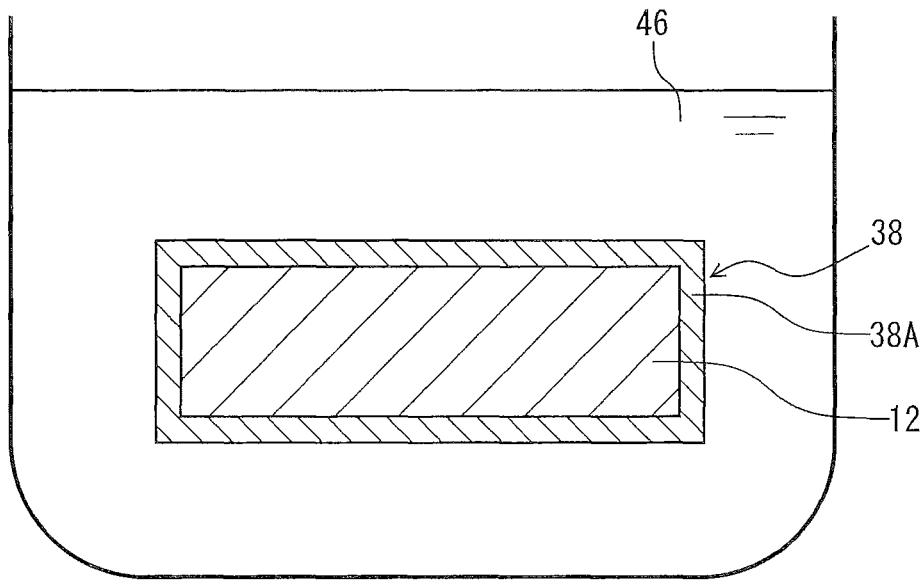
FIGS. 12 to 15 are schematic cross-sectional views showing steps of the method of manufacturing the bicycle component illustrated in FIG. 2.

As seen in FIGS. 11 and 12, the method of manufacturing the bicycle component 10 comprises forming the electrical insulation layer 38 on the first structural member 12 (step S4). In this embodiment, the forming of the electrical insulation layer 38 includes forming the electrodeposition coating layer 38A on the first structural member 12 with the electrodeposition coating process (step S4A). As seen in FIG. 12, the forming of the electrical insulation layer 38 includes putting the first structural member 12 in electrodeposition coating material 46 containing epoxy cationic coating material. The forming of the electrical insulation layer 38 includes applying voltage of approximately 100 to an anode electrode to anodize the first structural member 12 for approximately 3 minutes under a temperature of approximately 25 degrees Celsius in a state where the first structural member 12 is being put in the electrodeposition coating material 46. Thus, as seen in FIG. 12, the electrical insulation layer 38 is formed on the first structural member 12.

Figure 13:
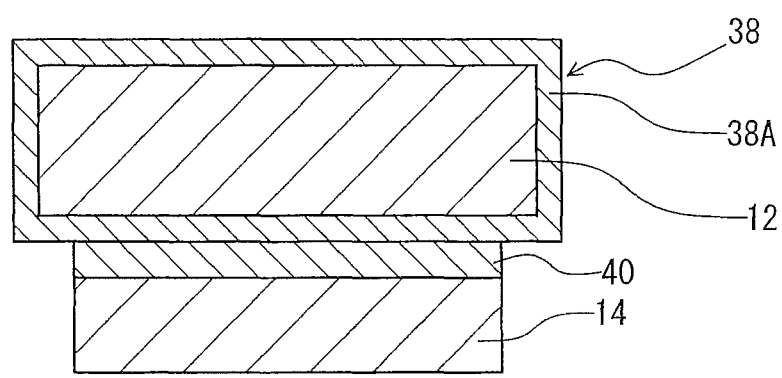

As seen in FIGS. 11 and 13, the method of manufacturing the bicycle component 10 comprises attaching the second structural member 14 to the electrical insulation layer 38 (step S5). For example, the attaching of the second structural member 14 includes attaching the second structural member 14 to the electrical insulation layer 38 with the adhesive 40.

Figure 14:
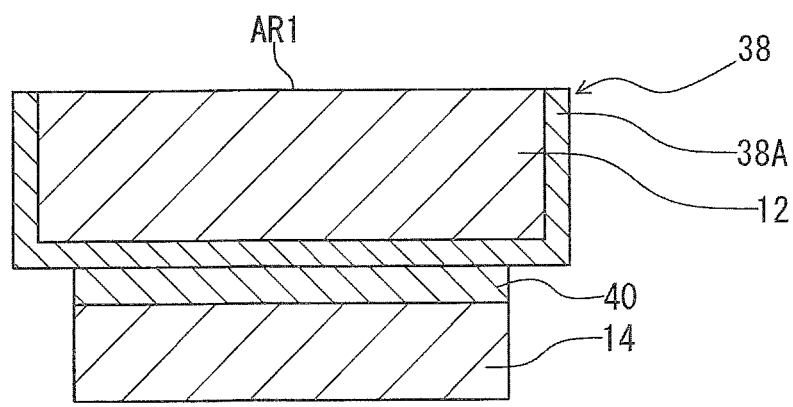

As seen in FIGS. 11 and 14, the method of manufacturing the bicycle component 10 comprises removing part of the electrical insulation layer 38 from the first structural member 12 (step S6). For example, the removing of the part of the electrical insulation layer 38 includes perform shot blasting on the part of the electrical insulation layer 38.

As seen in FIGS. 11 and 14, the method of manufacturing the bicycle component 10 comprises polishing the first structural member 12 in an area AR1 where the part of the electrical insulation layer 38 has been removed (step S7). For example, the polishing of the first structural member 12 includes buffing the first structural member 12.

Figure 15:
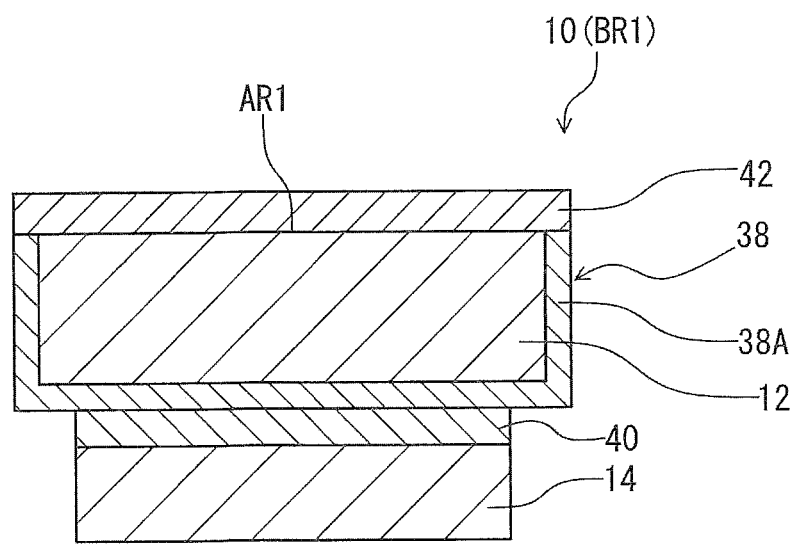

As seen in FIGS. 11 and 15, the method of manufacturing the bicycle component 10 comprises forming the anodized oxide layer 42 on the first structural member 12 (step S8). For example, the forming of the anodized oxide layer 42 includes putting the first structural member 12 in sulfuric acid having concentration of approximately 15%. The forming of the anodized oxide layer 42 includes applying current density of approximately 1.3 A/dm² to an anode electrode to anodize the first structural member 12 for approximately 20 minutes under a temperature of approximately 20 degrees Celsius in a state where the first structural member 12 is put in the sulfuric acid. In this process, the electrical insulation layer 38 (the electrodeposition coating layer 38A) insulates between the first structural member 12 and the second structural member 14. Thus, the anodized oxide layer 42 can be stably formed on the area AR1 of the first structural member 12. The method of manufacturing the bicycle component 10 comprises applying dye compound to the anodized oxide layer 42 (step S9). For example, the applying of the dye compound includes heating the first structural member 12 to dry the anodized oxide layer 42 after the forming of the anodized oxide layer 42.

As seen in FIG. 11, the method of manufacturing the bicycle component 10 comprises sealing the pores with a sealing layer to fix the dye compound in the anodized oxide layer 42 (step S10). For example, the sealing of the pores includes putting the first structural member 12 with the anodized oxide layer 42 in a sealing solution including the sealing material for approximately 15 minutes under a temperature of approximately 90 degrees Celsius. The sealing material includes nickel acetate. The sealing material covers the pores of the anodized oxide layer 42. The bicycle component 10 is washed with water to remove the remaining sealing solution from the anodized oxide layer 42 or other part of the bicycle component 10. Thus, it is possible to manufacture the bicycle component 10.

Second Embodiment

A bicycle component 210 and a bicycle rim BR2 in accordance with a second embodiment will be described below referring to FIGS. 16 to 20. The bicycle component 210 has the same structure and/or configuration as those of the bicycle component 10 except for the second structural member 14 and the third structural member 16. The bicycle rim BR2 has the same structure and/or configuration as those of the bicycle rim BR1 except for the base member 14 and the tire-attachment member 16. Thus, elements having substantially the same function as those in the first embodiment will be numbered the same here, and will not be described and/or illustrated again in detail here for the sake of brevity.

Figure 16:
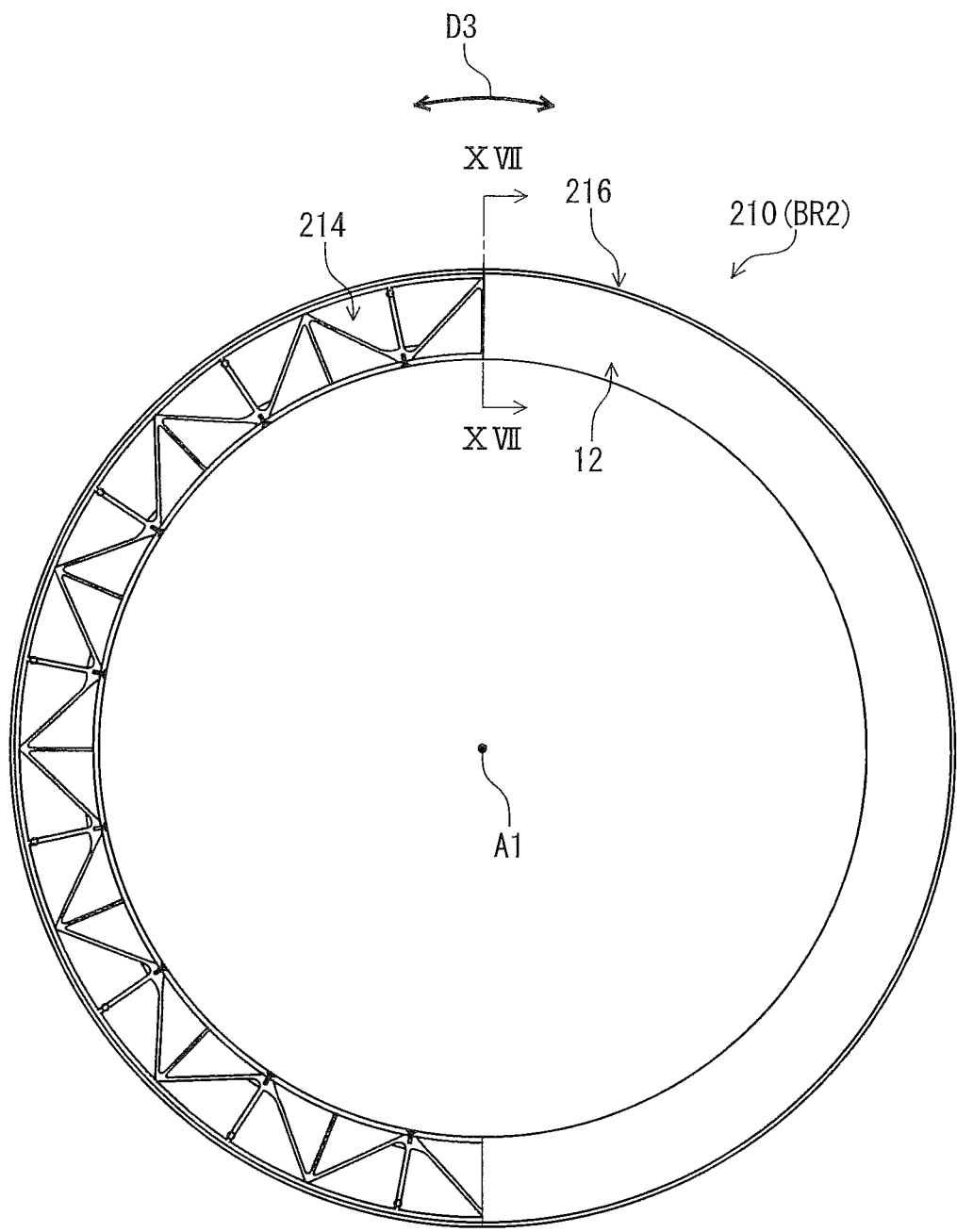
FIG. 16 is a side elevational view of a bicycle component in accordance with a second embodiment.
Figure 17:
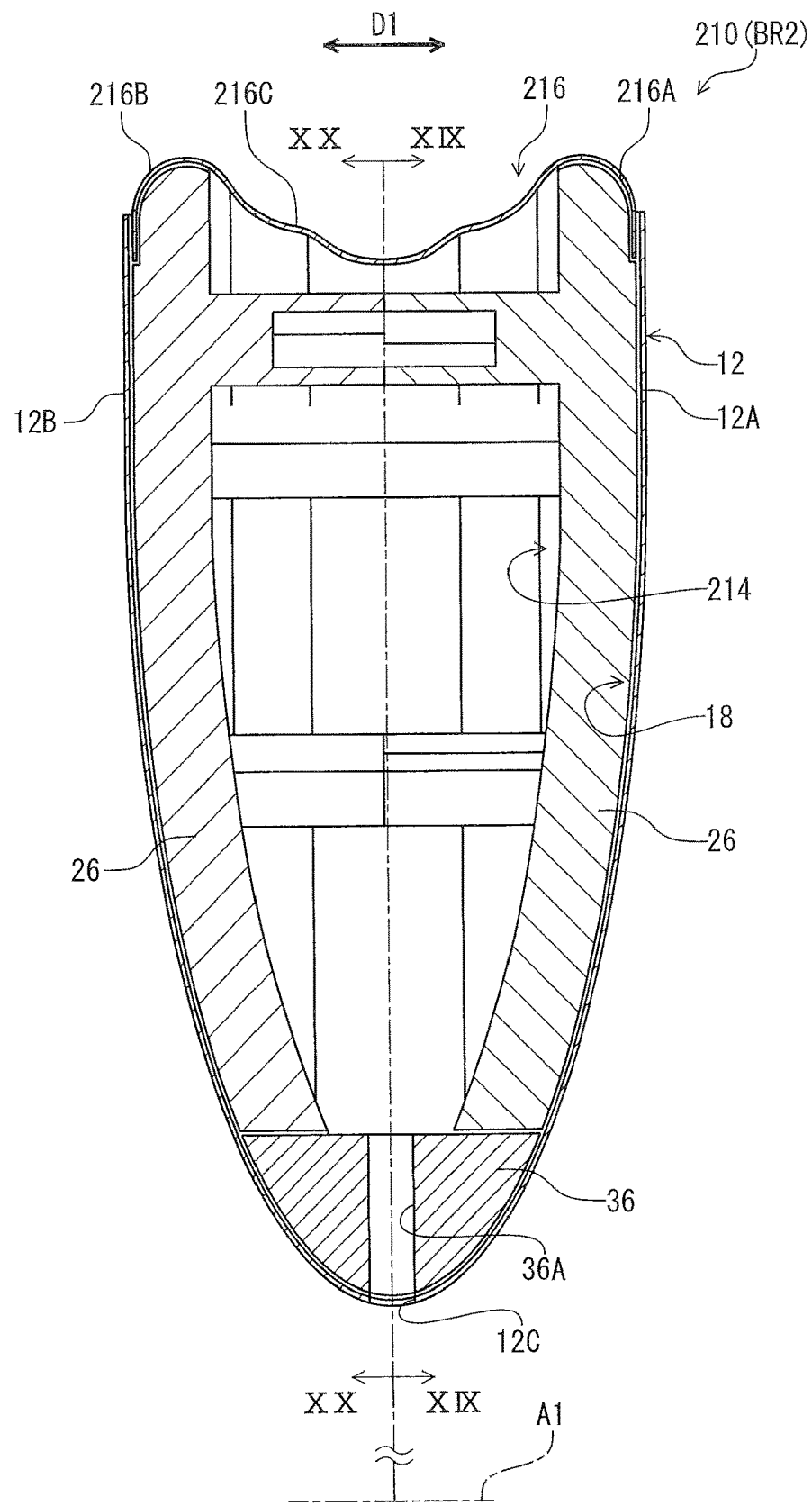
FIG. 17 is a cross-sectional view of the bicycle component taken along line XVII-XVII of FIG. 16.
Figure 18:
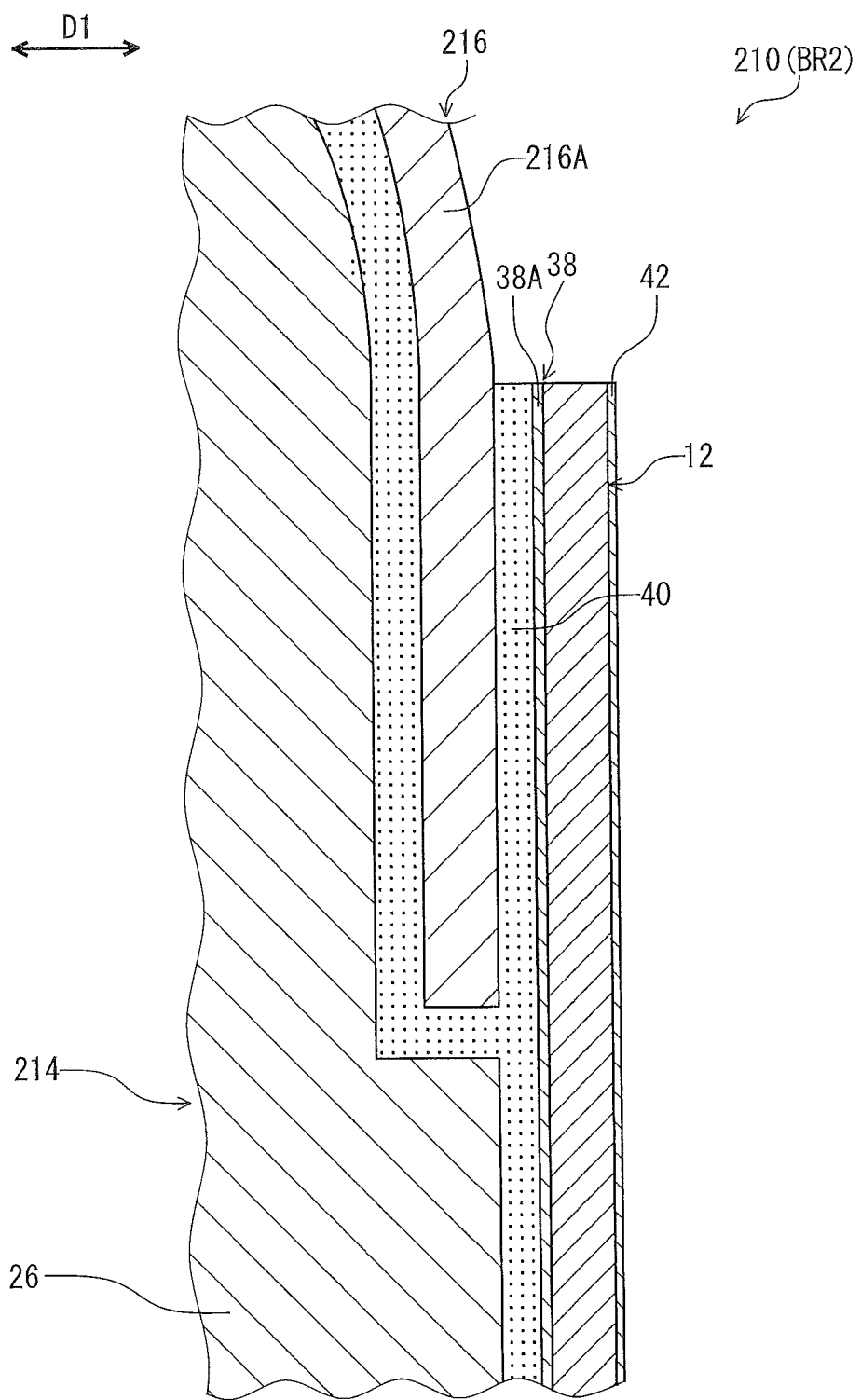
FIG. 18 is a partial enlarged cross-sectional view of the bicycle component illustrated in FIG. 16.

As seen in FIG. 16, the bicycle component 210 comprises the first structural member 12, a second structural member 214, and a third structural member 216. Specifically, the bicycle rim BR2 comprises the cover member 12, a base member 214, and a tire-attachment member 216. As seen in FIG. 17, in this embodiment, the bicycle rim BR2 is a tubular rim. As seen in FIG. 18, the bicycle component 210 (the bicycle rim BR2) comprises the electrical insulation layer 38. The second structural member (the base member) 214 is configured to be attached to the electrical insulation layer 38 by the adhesive 40.

Figure 19:
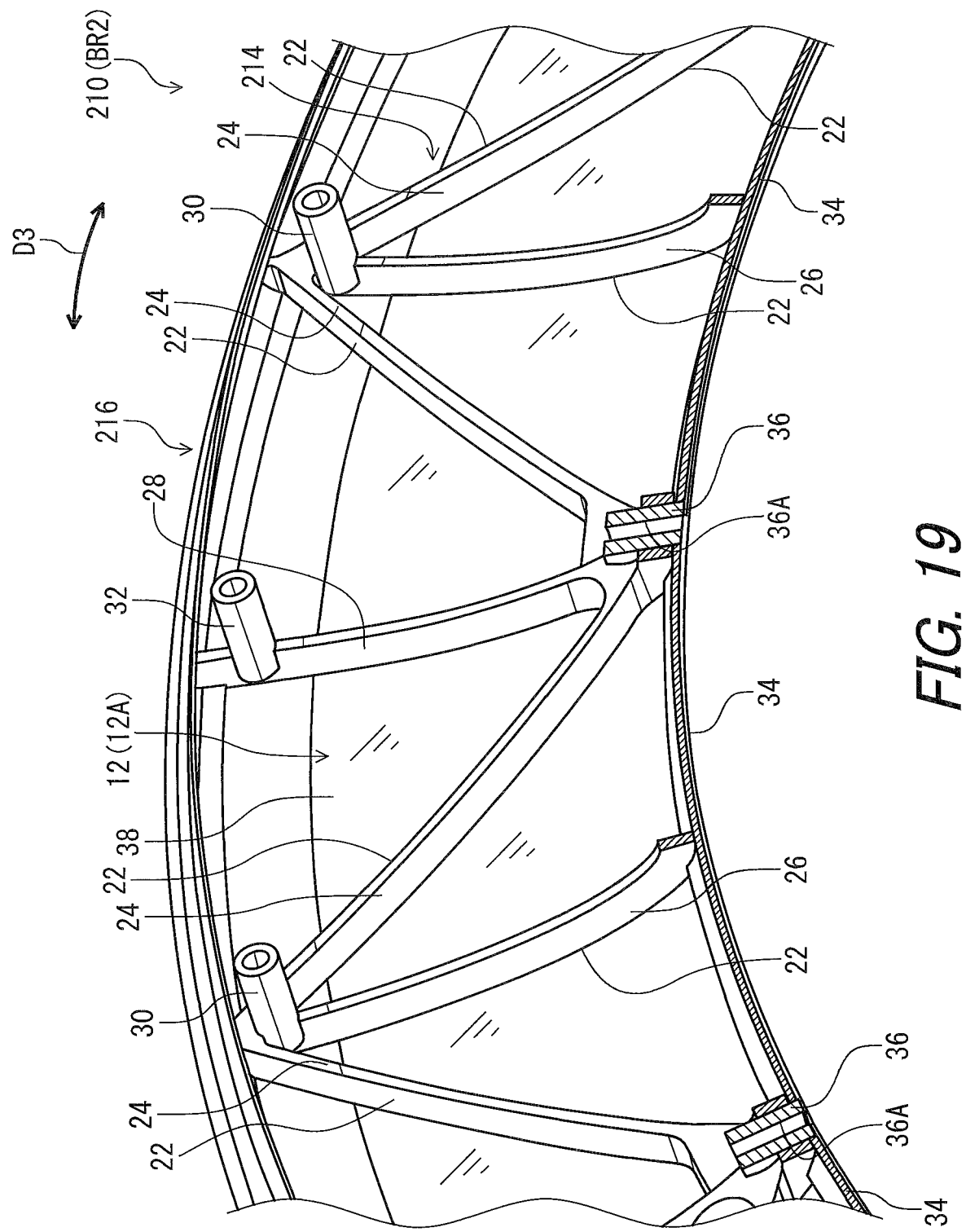
FIG. 19 is a partial perspective cross-sectional view of the bicycle component taken along with line XIX-XIX of FIG. 17.
Figure 20:
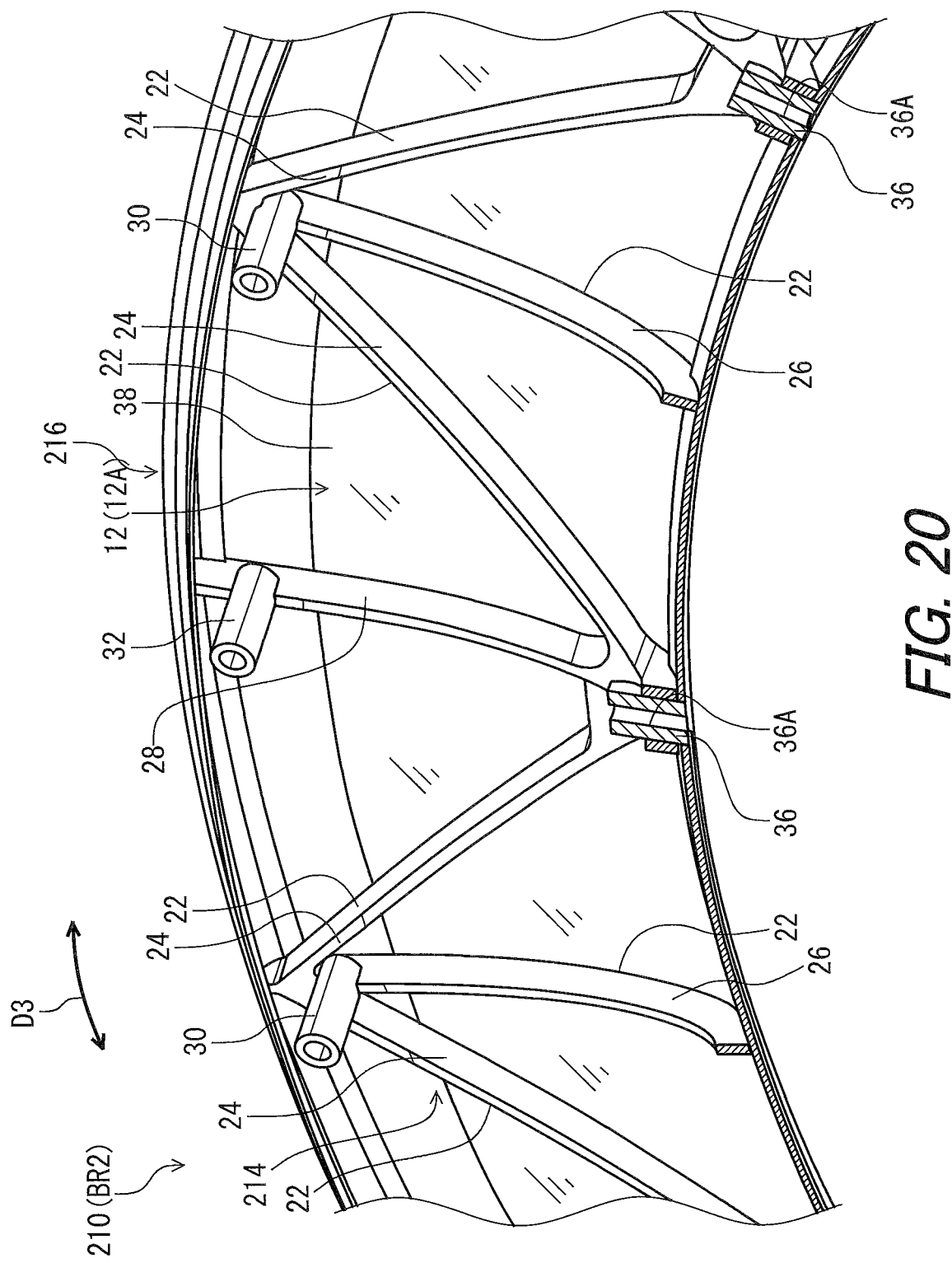
FIG. 20 is another partial perspective cross-sectional view of the bicycle component taken along with line XX-XX of FIG. 17.

As seen in FIGS. 16, 19, and 20, the second structural member (the base member) 214 has substantially the same structure as that of the second structural member (the base member) 14 of the first embodiment. In this embodiment, a total number of the slanting members 24 of the second structural member (the base member) 214 is smaller than a total number of the slanting members 24 of the second structural member (the base member) 14 of the first embodiment. A total number of the radially extending members 26 of the second structural member (the base member) 214 is smaller than a total number of the radially extending members 26 of the second structural member (the base member) 14 of the first embodiment. A total number of the radially extending members 28 of the second structural member (the base member) 214 is smaller than a total number of the radially extending members 28 of the second structural member (the base member) 14 of the first embodiment.

As seen in FIGS. 17 and 18, the third structural member 216 is configured to be attached to the first structural member 12 and the second structural member 14. The third structural member 216 can also be referred to as a tire-attachment member 216. The bicycle rim BR2 comprises the tire-attachment member 216. The bicycle rim BR2 comprises the tire-attachment member 216. The tire-attachment member 216 includes a first tire-attachment part 216A, a second tire-attachment part 216B, and an intermediate part 216C. The intermediate part 216C is integrally provided with the first tire-attachment part 216A and the second tire-attachment part 216B as a one-piece unitary member. The third structural member (the tire-attachment member) 216 has substantially the same structure as that of the third structural member (the tire-attachment member) 16 of the first embodiment. As seen in FIG. 18, the third structural member (the tire-attachment member) 216 is configured to be attached to the electrical insulation layer 38 by the adhesive 40.

Third Embodiment

A bicycle component 310 and a bicycle rim BR3 in accordance with a third embodiment will be described below referring to FIGS. 21 to 27. The bicycle component 310 has the same structure and/or configuration as those of the bicycle component 10 except for the second structural member 14 and the third structural member 16. The bicycle rim BR3 has the same structure and/or configuration as those of the bicycle rim BR1 except for the base member 14 and the tire-attachment member 16. Thus, elements having substantially the same function as those in the above embodiments will be numbered the same here, and will not be described and/or illustrated again in detail here for the sake of brevity.

Figure 21:
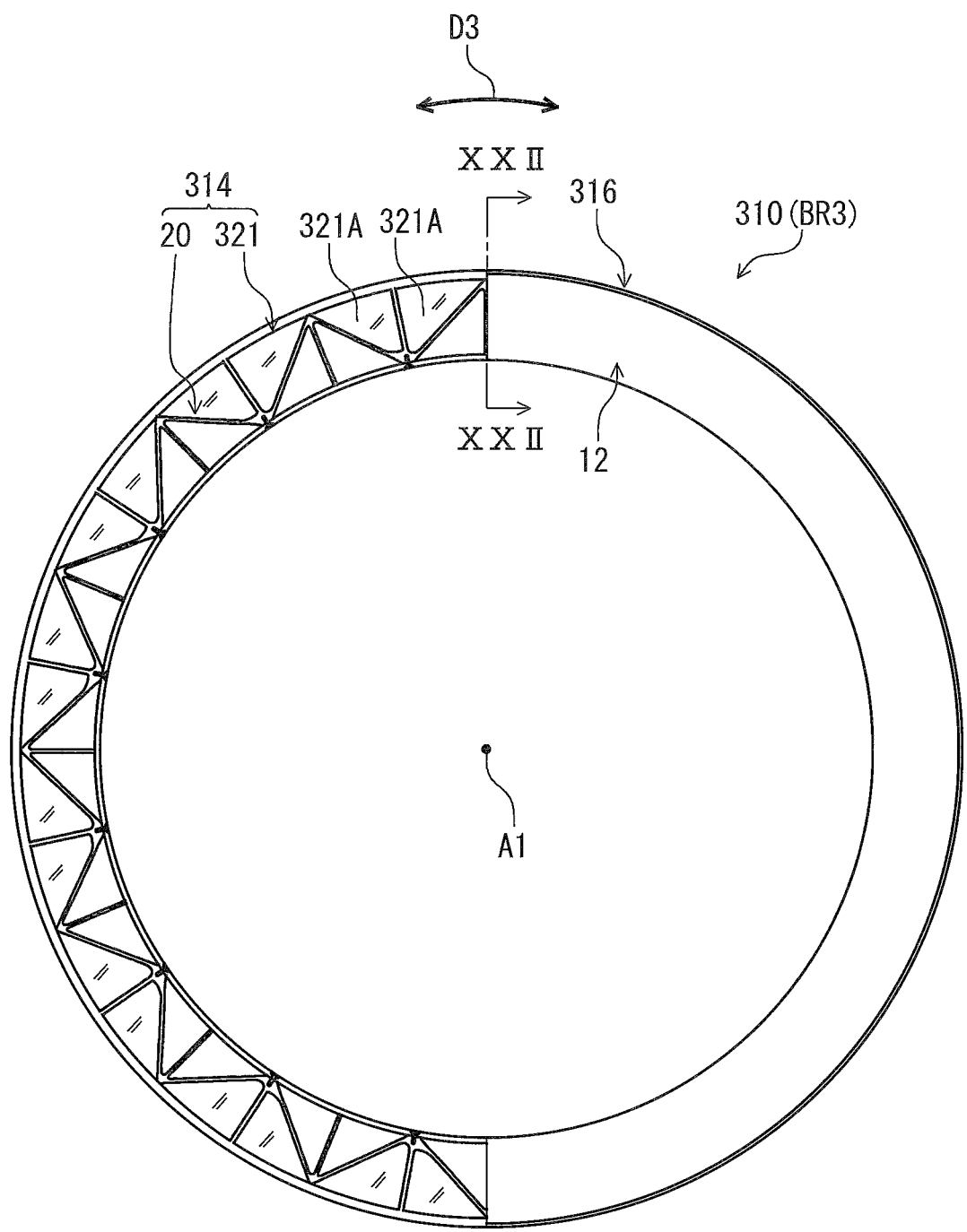
FIG. 21 is a side elevational view of a bicycle component in accordance with a third embodiment.
Figure 22:
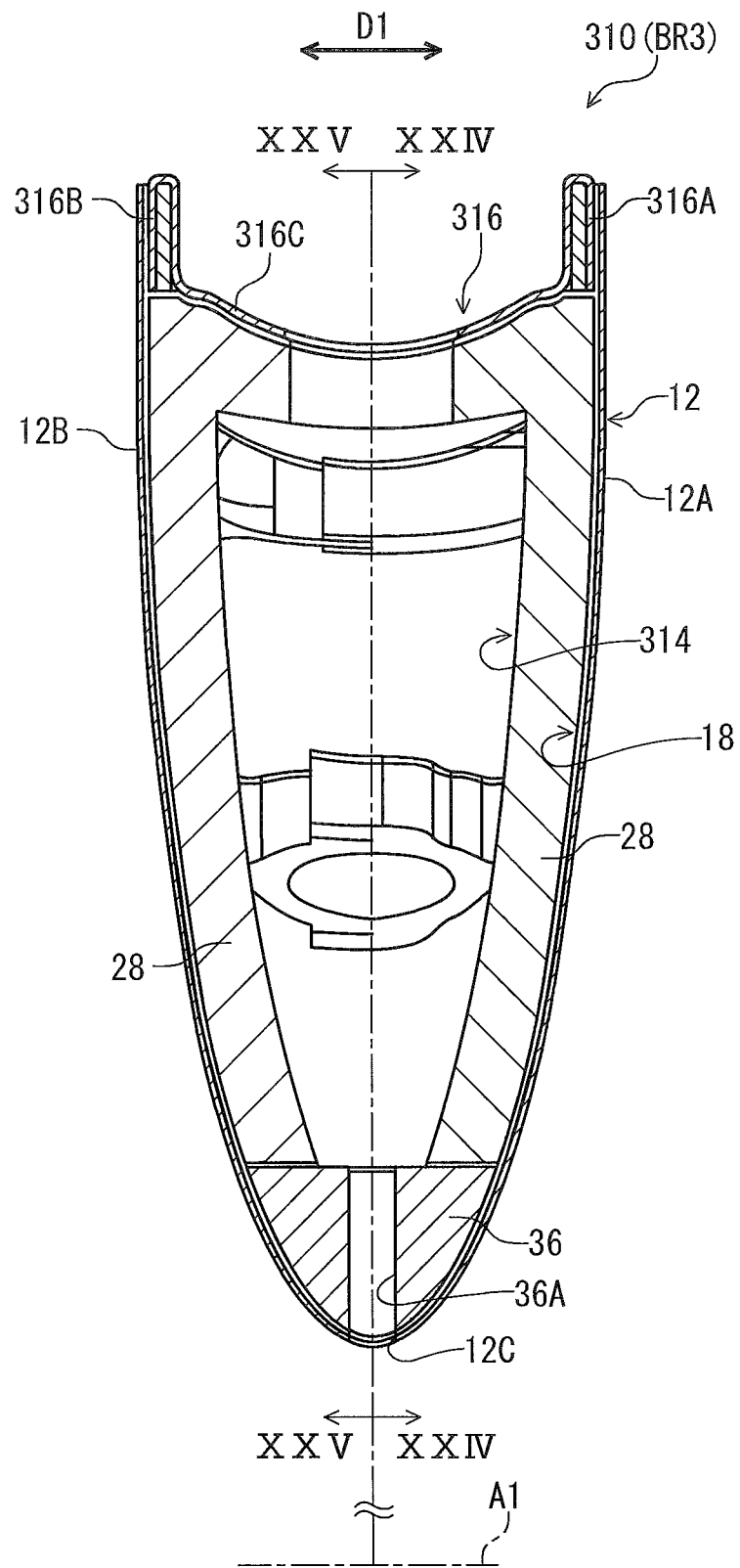
FIG. 22 is a cross-sectional view of the bicycle component taken along line XXII-XXII of FIG. 21.
Figure 23:
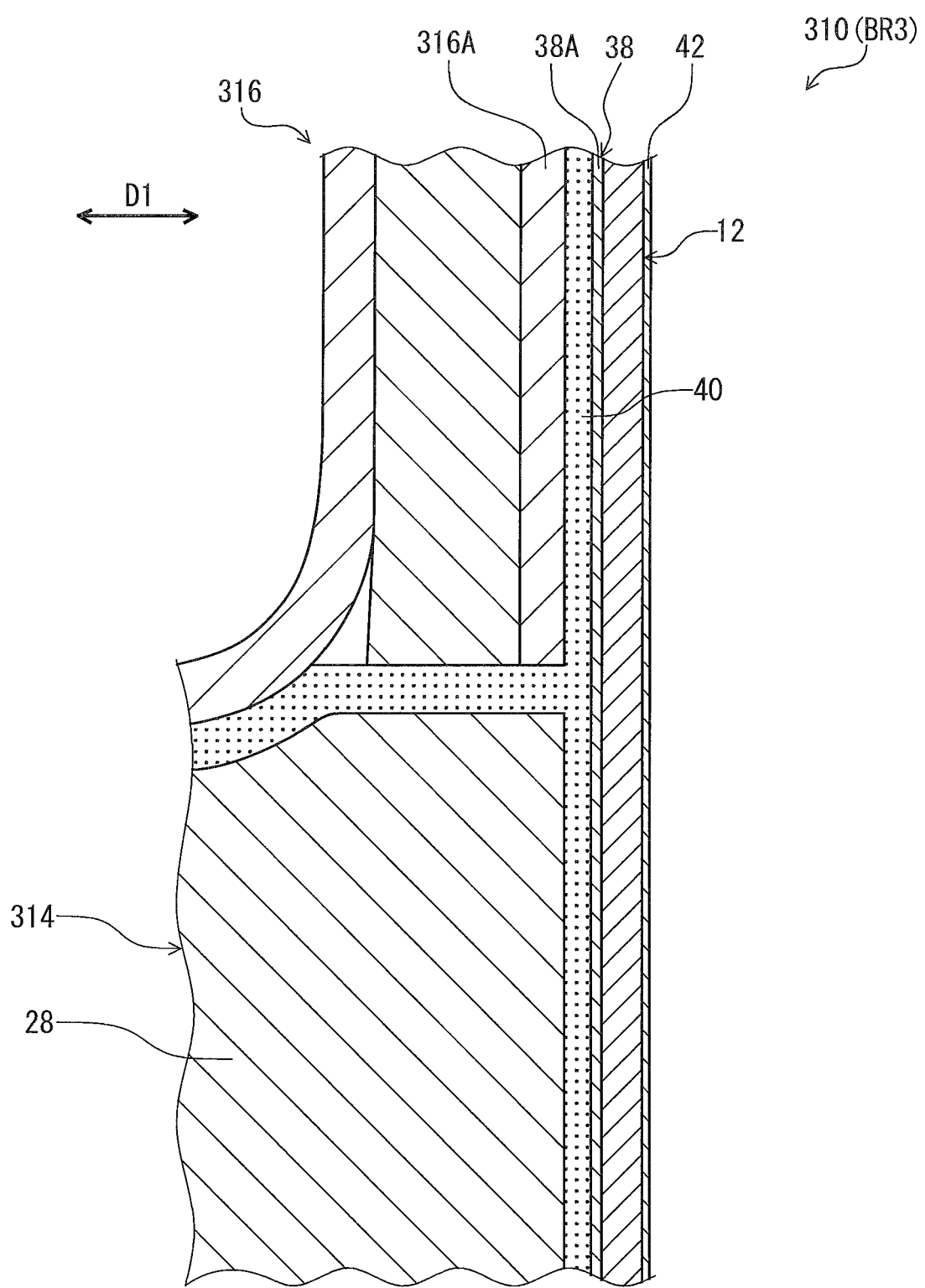
FIG. 23 is a partial enlarged cross-sectional view of the bicycle component illustrated in FIG. 21.

As seen in FIG. 21, the bicycle component 310 comprises the first structural member 12, a second structural member 314, and a third structural member 316. Specifically, the bicycle rim BR3 comprises the cover member 12, a base member 314, and a tire-attachment member 316. As seen in FIG. 22, in this embodiment, the bicycle rim BR3 is a clincher rim. As seen in FIG. 23, the bicycle component 310 (the bicycle rim BR3) comprises the electrical insulation layer 38. The second structural member (the base member) 314 is configured to be attached to the electrical insulation layer 38 by the adhesive 40.

Figure 24:
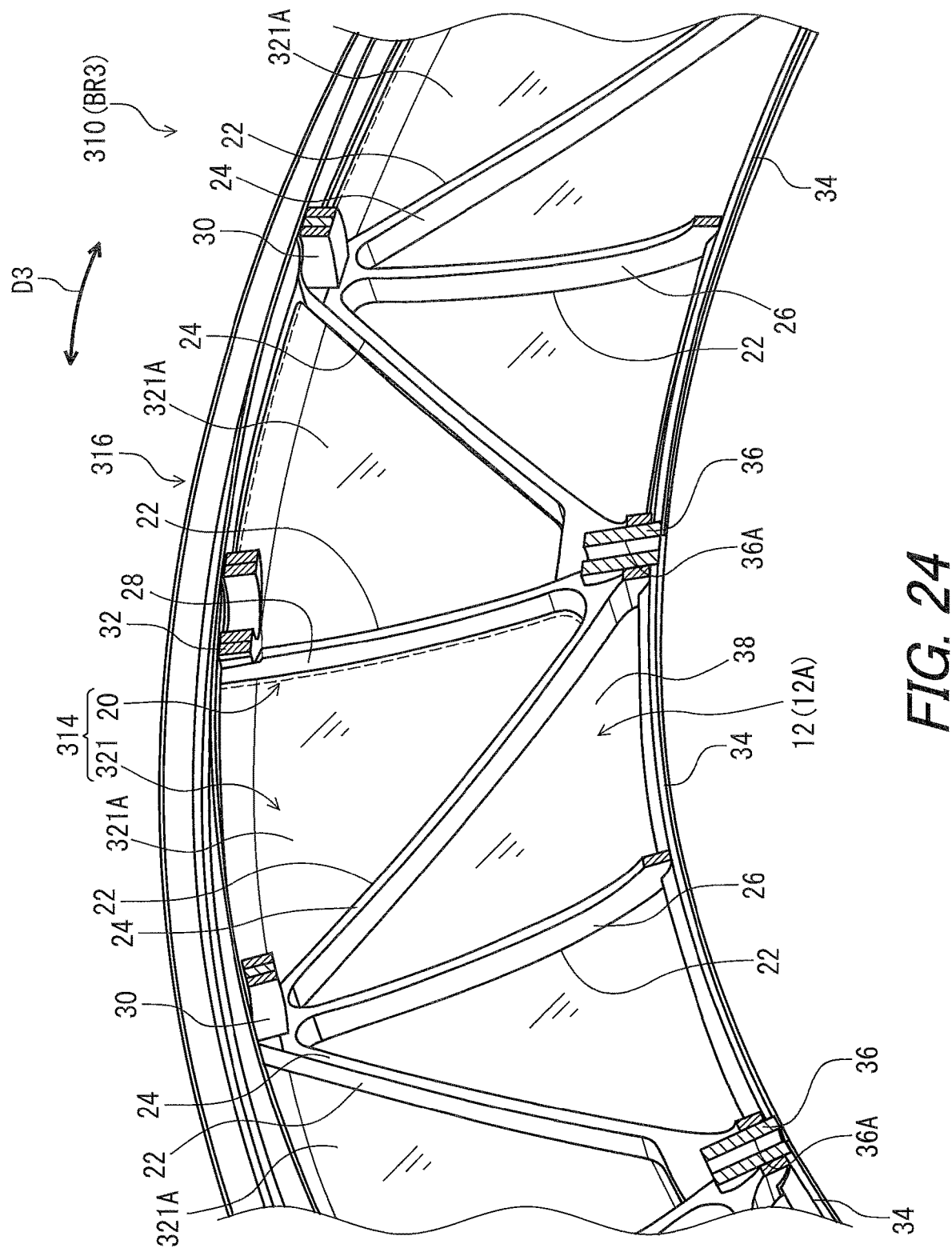
FIG. 24 is a partial perspective cross-sectional view of the bicycle component taken along with line XXIV-XXIV of FIG. 22.
Figure 25:
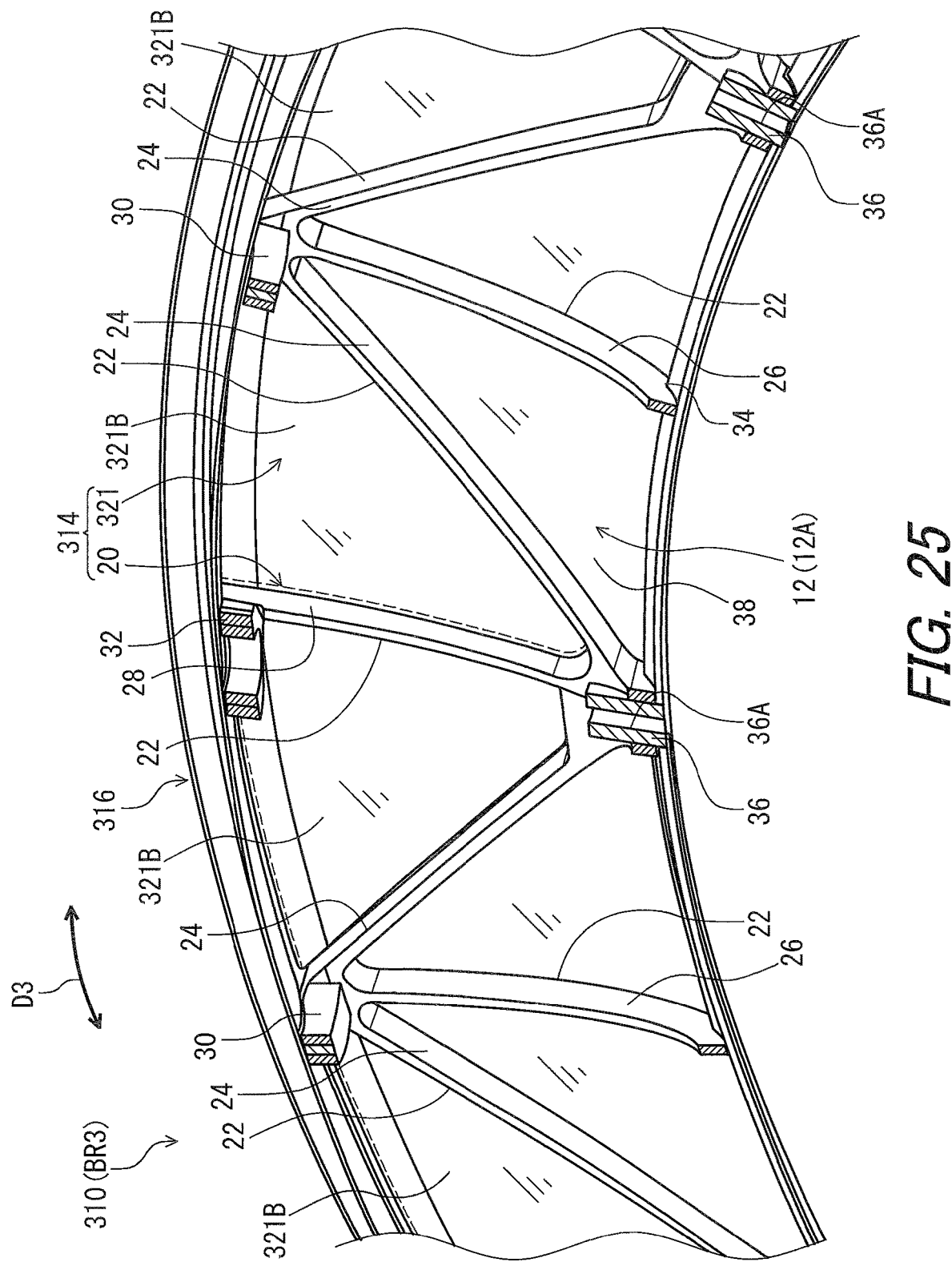
FIG. 25 is another partial perspective cross-sectional view of the bicycle component taken along with line XXV-XXV of FIG. 22.

As seen in FIGS. 21, 24, and 25, the second structural member (the base member) 314 has substantially the same structure as that of the second structural member (the base member) 14 of the first embodiment. In this embodiment, a total number of the slanting members 24 of the second structural member (the base member) 314 is smaller than a total number of the slanting members 24 of the second structural member (the base member) 14 of the first embodiment. A total number of the radially extending members 26 of the second structural member (the base member) 314 is smaller than a total number of the radially extending members 26 of the second structural member (the base member) 14 of the first embodiment. A total number of the radially extending members 28 of the second structural member (the base member) 314 is smaller than a total number of the radially extending members 28 of the second structural member (the base member) 14 of the first embodiment.

Figure 26:
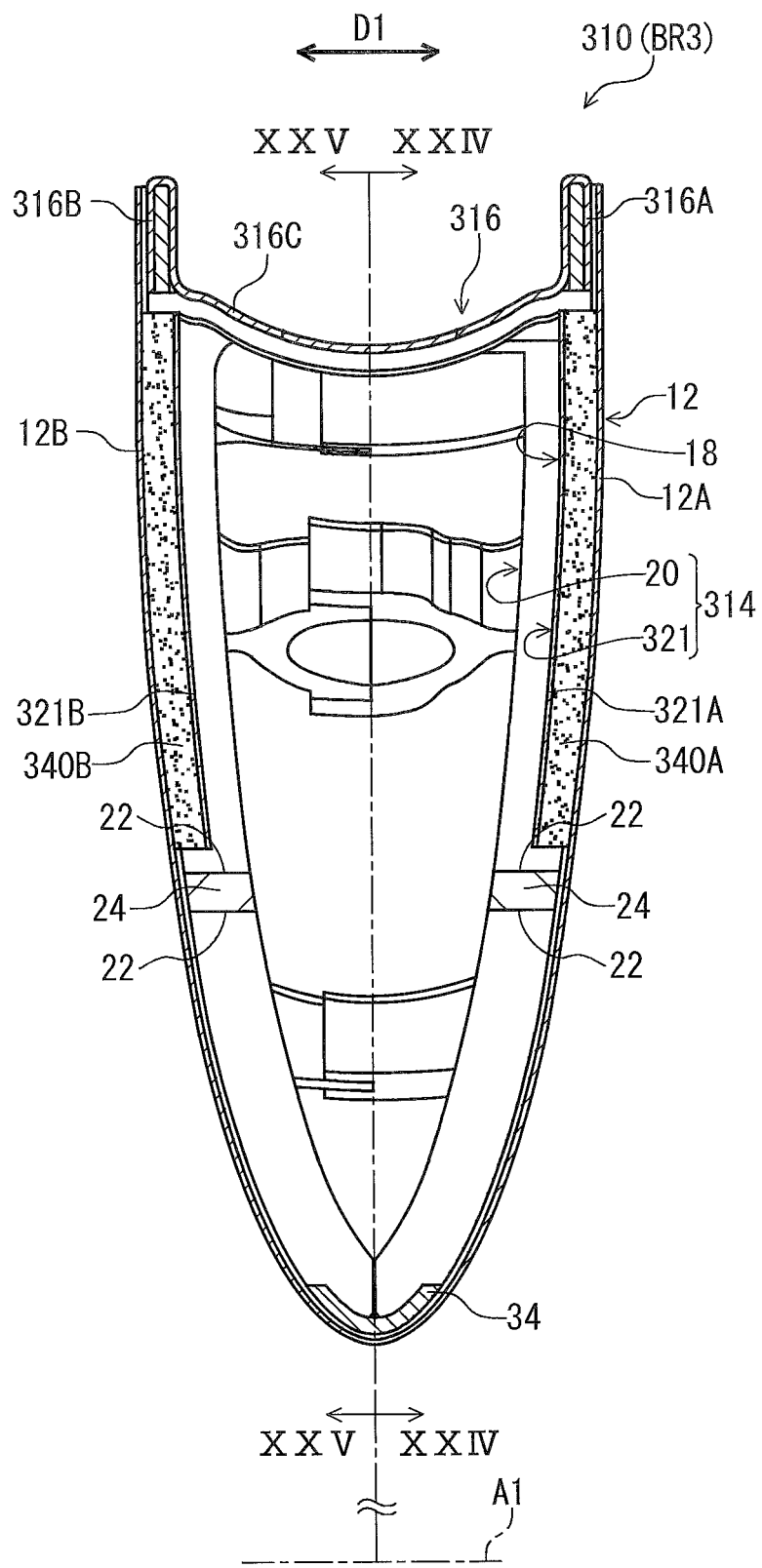
FIG. 26 is another cross-sectional view of the bicycle component illustrated in FIG. 21.

As seen in FIG. 26, the second structural member 314 includes a reinforcement member 321 in addition to the truss structure 20. The reinforcement member 321 includes at least one first reinforcement part 321A and at least one second reinforcement part 321B. The at least one first reinforcement part 321A is a separate part from the at least one second reinforcement part 321B. The at least one first reinforcement part 321A is attached to the first cover 12A of the cover member 12. The at least one second reinforcement part 321B is attached to the second cover 12B of the cover member 12.

As seen in FIGS. 24 and 25, the reinforcement member 321 includes a plurality of first reinforcement parts 321A and a plurality of second reinforcement parts 321B. As seen in FIG. 24, the first reinforcement part 321A is provided between the slanting member 24 and the radially extending member 28 in the circumferential direction D3. Preferably, the first reinforcement part 321A is shaped to fit the at least one opening 22 defined by the truss structure 20. As seen in FIG. 25, the second reinforcement part 321B is provided between the slanting member 24 and the radially extending member 28 in the circumferential direction D3. Preferably, the second reinforcement part 321B is shaped to fit the at least one opening 22 defined by the truss structure 20. However, the positions of the first reinforcement part 321A and the second reinforcement part 321B are not limited to this embodiment.

Figure 27:
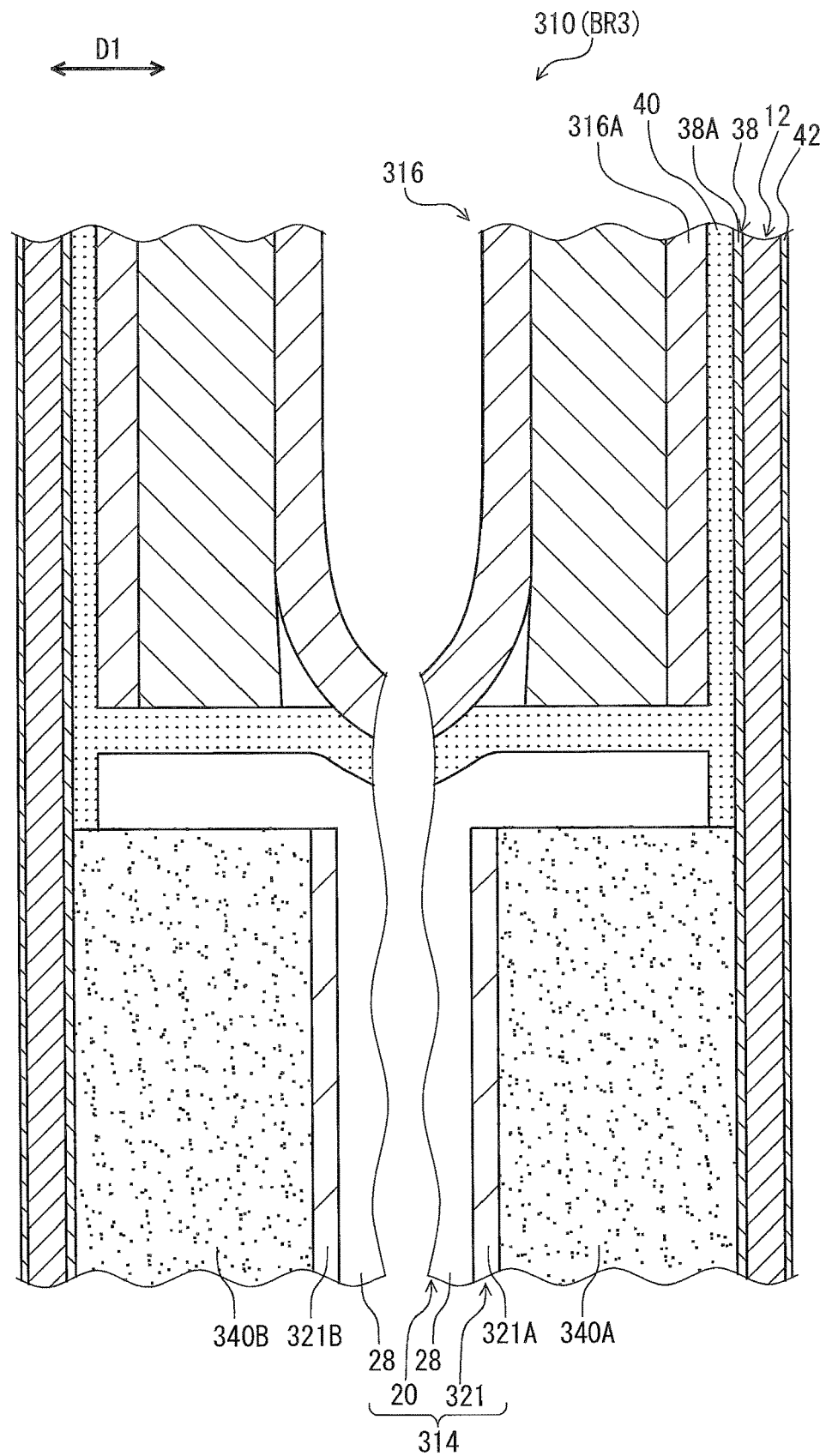
FIG. 27 is another partial enlarged cross-sectional view of the bicycle component illustrated in FIG. 21.

As seen in FIG. 27, the reinforcement member 321 is configured to be attached to the electrical insulation layer 38 by adhesive 340A. The first reinforcement part 321A is configured to be attached to the electrical insulation layer 38 by the adhesive 340A. The adhesive 340A is provided between the first reinforcement part 321A and the electrical insulation layer 38 in an axial direction D1 with respect to the rotational center axis A1 of the bicycle rim BR3 to adhere the first reinforcement part 321A to the electrical insulation layer 38. The first reinforcement part 321A is made of a first material different from a material of the adhesive 340A. In this embodiment, the first material of the first reinforcement part 321A includes fiber reinforced plastic such as glass fiber reinforced plastic and carbon fiber reinforced plastic. The material of the adhesive 340A includes a resin material such as epoxy resin, preferably foaming epoxy resin. A thickness of the adhesive 340A is larger than a thickness of the first reinforcement part 321A. For example, the thickness of the adhesive 340A is approximately 2 mm while the thickness of the first reinforcement part 321A ranges from 0.2 mm to 0.3 mm. However, the thicknesses of the first reinforcement part 321A and the adhesive 340A are not limited to this embodiment.

The second reinforcement part 321B is configured to be attached to the electrical insulation layer 38 by adhesive 340B. The adhesive 340B is provided between the second reinforcement part 321B and the electrical insulation layer 38 in the axial direction D1 with respect to the rotational center axis A1 of the bicycle rim BR3 to adhere the second reinforcement part 321B to the electrical insulation layer 38. The second reinforcement part 321B is made of a second material different from a material of the adhesive 340B. In this embodiment, the second material of the second reinforcement part 321B includes fiber reinforced plastic such as glass fiber reinforced plastic and carbon fiber reinforced plastic. A thickness of the adhesive 340B is larger than a thickness of the second reinforcement part 321B. For example, the thickness of the adhesive 340B is equal to approximately 2 mm while the thickness of the second reinforcement part 321B ranges from 0.2 mm to 0.3 mm. However, the thicknesses of the second reinforcement part 321B and the adhesive 340B are not limited to this embodiment.

In this embodiment, the second material of the second reinforcement part 321B is the same as the first material of the first reinforcement part 321A. The material of the adhesive 340B is the same as the material of the adhesive 340A. However, the second material of the second reinforcement part 321B can be different from the first material of the first reinforcement part 321A. The material of the adhesive 340B can be different from the material of the adhesive 340A.

In this embodiment, each of the first reinforcement part 321A and the second reinforcement part 321B is integrally provided as a one-piece unitary portion. However, the first reinforcement part 321A can include a plurality of portions such as a plurality of layers. The second reinforcement part 321B can include a plurality of portions such as a plurality of layers. Furthermore, a total number of the first reinforcement parts 321A is not limited to this embodiment. A total number of the second reinforcement parts 321B is not limited to this embodiment. The first reinforcement parts 321A can be integrally provided as a one-piece unitary part. The second reinforcement parts 321B can be integrally provided as a one-piece unitary part.

As seen in FIGS. 22 and 23, the third structural member 316 is configured to be attached to the first structural member 12 and the second structural member 314. The third structural member 316 can also be referred to as a tire-attachment member 316. The bicycle rim BR4 comprises the tire-attachment member 316. The bicycle rim BR3 comprises the tire-attachment member 316. The tire-attachment member 316 includes a first tire-attachment part 316A, a second tire-attachment part 316B, and an intermediate part 316C. The intermediate part 316C is integrally provided with the first tire-attachment part 316A and the second tire-attachment part 316B as a one-piece unitary member. The third structural member (the tire-attachment member) 316 has substantially the same structure as that of the third structural member (the tire-attachment member) 16 of the first embodiment. As seen in FIG. 23, the third structural member (the tire-attachment member) 316 is configured to be attached to the electrical insulation layer 38 by the adhesive 40.

Fourth Embodiment

A bicycle component 410 and a bicycle rim BR4 in accordance with a fourth embodiment will be described below referring to FIGS. 28 to 30. The bicycle component 410 has the same structure and/or configuration as those of the bicycle component 310 except for the second structural member 314. The bicycle rim BR4 has the same structure and/or configuration as those of the bicycle rim BR3 except for the base member 314. Thus, elements having substantially the same function as those in the above embodiments will be numbered the same here, and will not be described and/or illustrated again in detail here for the sake of brevity.

Figure 28:
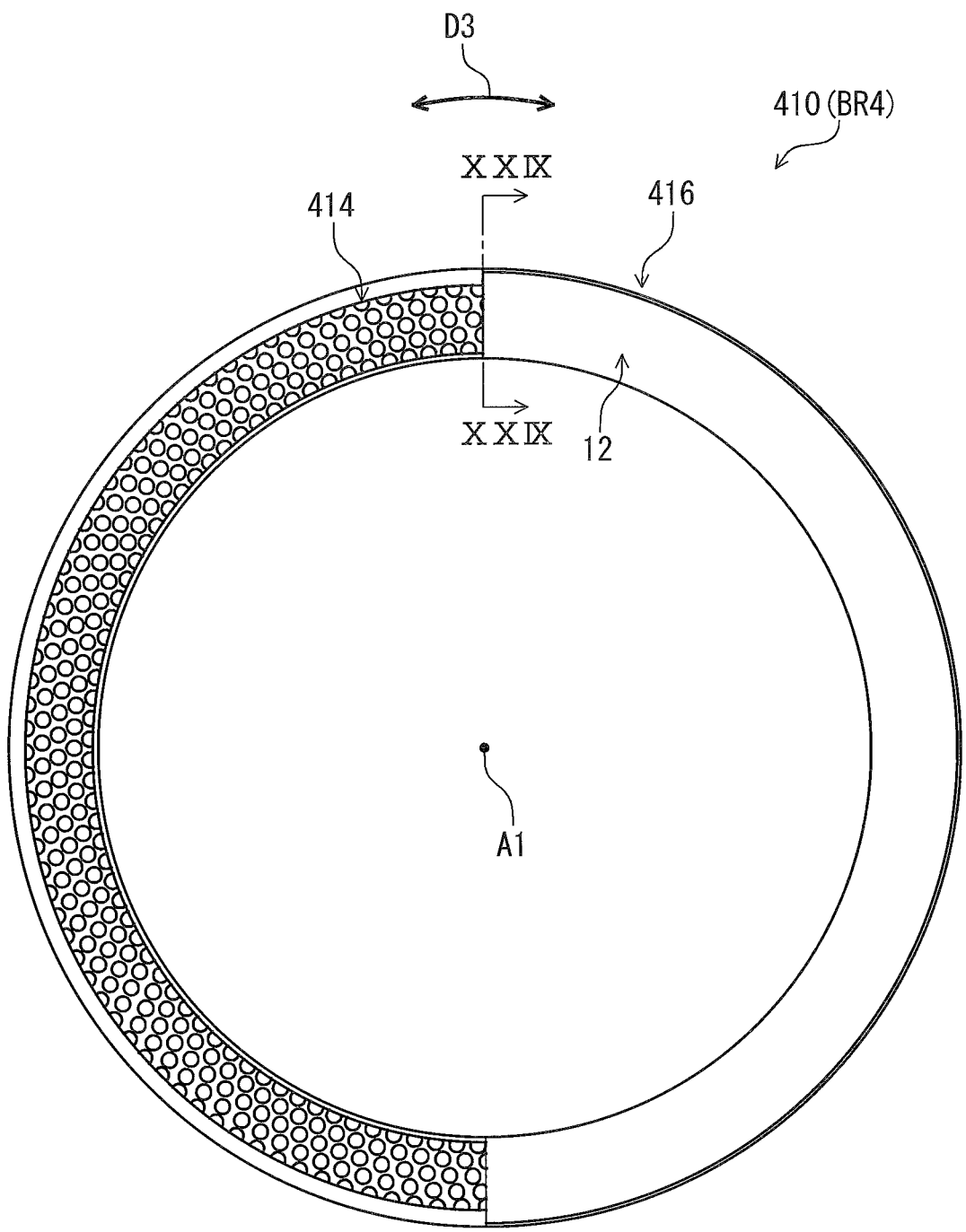
FIG. 28 is a side elevational view of a bicycle component in accordance with a fourth embodiment.
Figure 29:
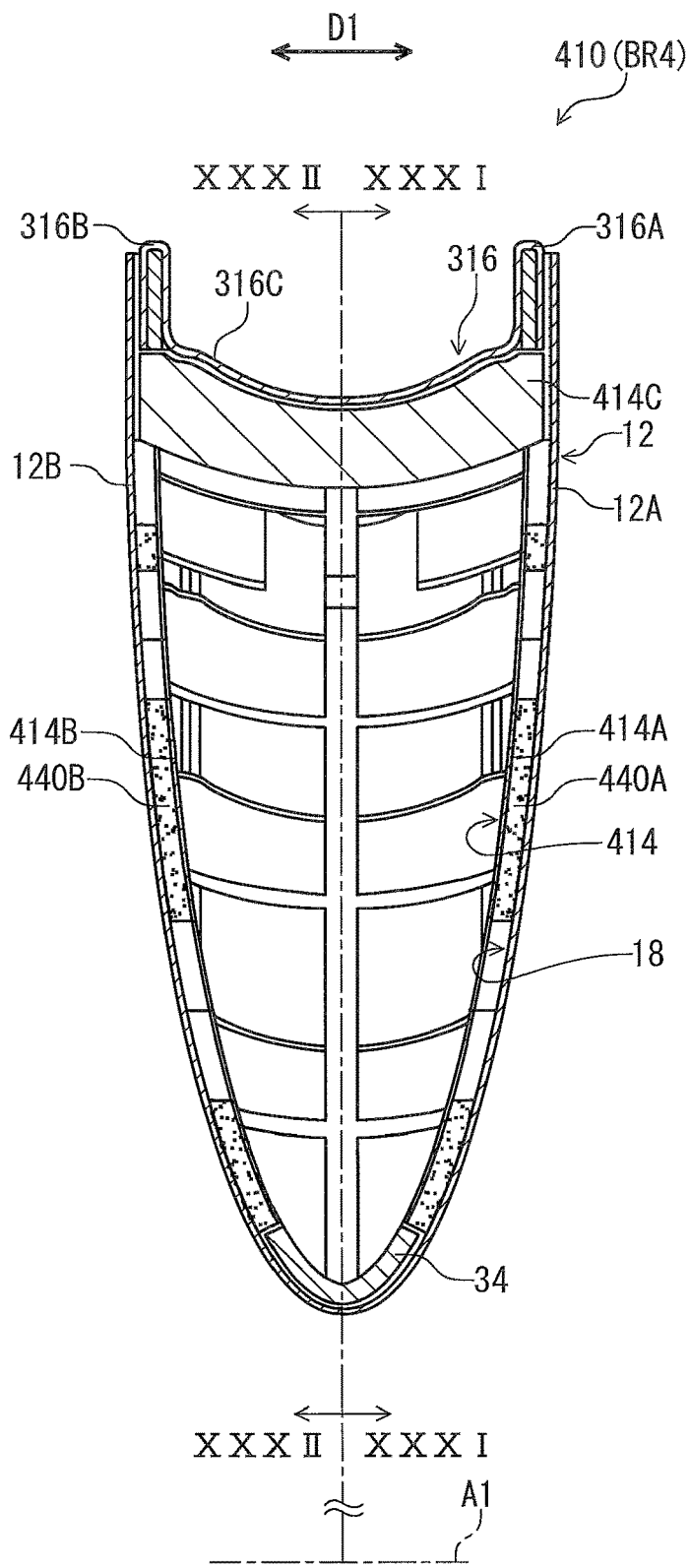
FIG. 29 is a cross-sectional view of the bicycle component taken along line XXIX-XXIX of FIG. 28.

As seen in FIG. 28, the bicycle component 410 comprises the first structural member 12, a second structural member 414, and the third structural member 316. Specifically, the bicycle rim BR4 comprises the cover member 12, a base member 414, and the tire-attachment member 316. As seen in FIG. 29, in this embodiment, the bicycle rim BR4 is a clincher rim. As seen in FIG. 30, the bicycle component 410 (the bicycle rim BR4) comprises the electrical insulation layer 38. The second structural member (the base member) 414 is configured to be attached to the electrical insulation layer 38 by the adhesive 40.

Figure 30:
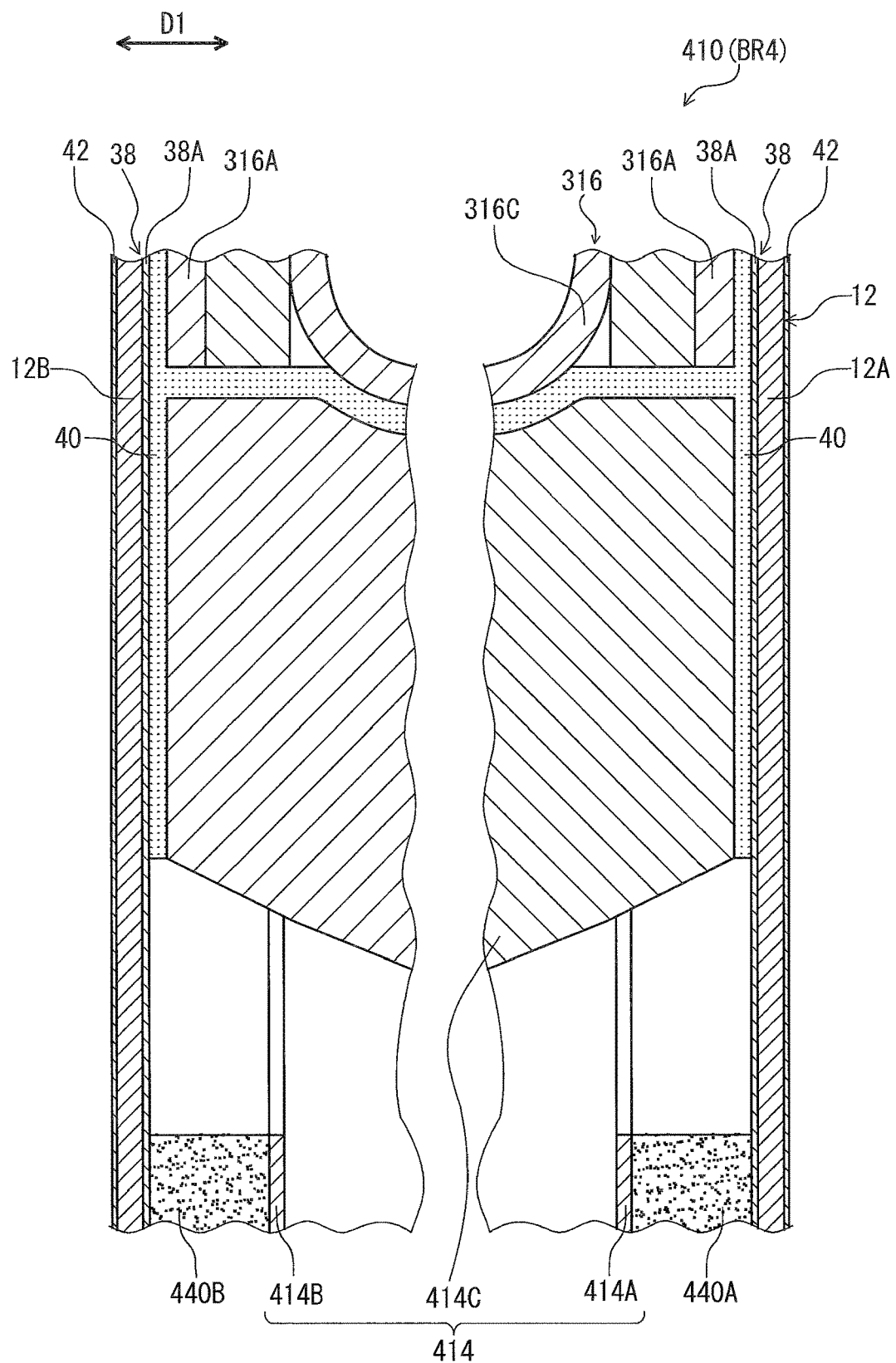
FIG. 30 is a partial enlarged cross-sectional view of the bicycle component illustrated in FIG. 28.

As seen in FIG. 30, the second structural member 414 includes a first reinforcement part 414A, a second reinforcement part 414B, and a third reinforcement part 414C instead of the truss structure 20. The first reinforcement part 414A is configured to be attached to the electrical insulation layer 38 by adhesive 440A. The second reinforcement part 414B is configured to be attached to the electrical insulation layer 38 by adhesive 440B. The third reinforcement part 414C is configured to be attached to the third structural member 316 by the adhesive 40. In this embodiment, the first to third reinforcement parts 414A, 414B, and 414C are separate members from each other. However, at least two of the first to third reinforcement parts 414A, 414B, and 414C can be integrally provided with each other as a one-piece unitary member.

Figure 31:
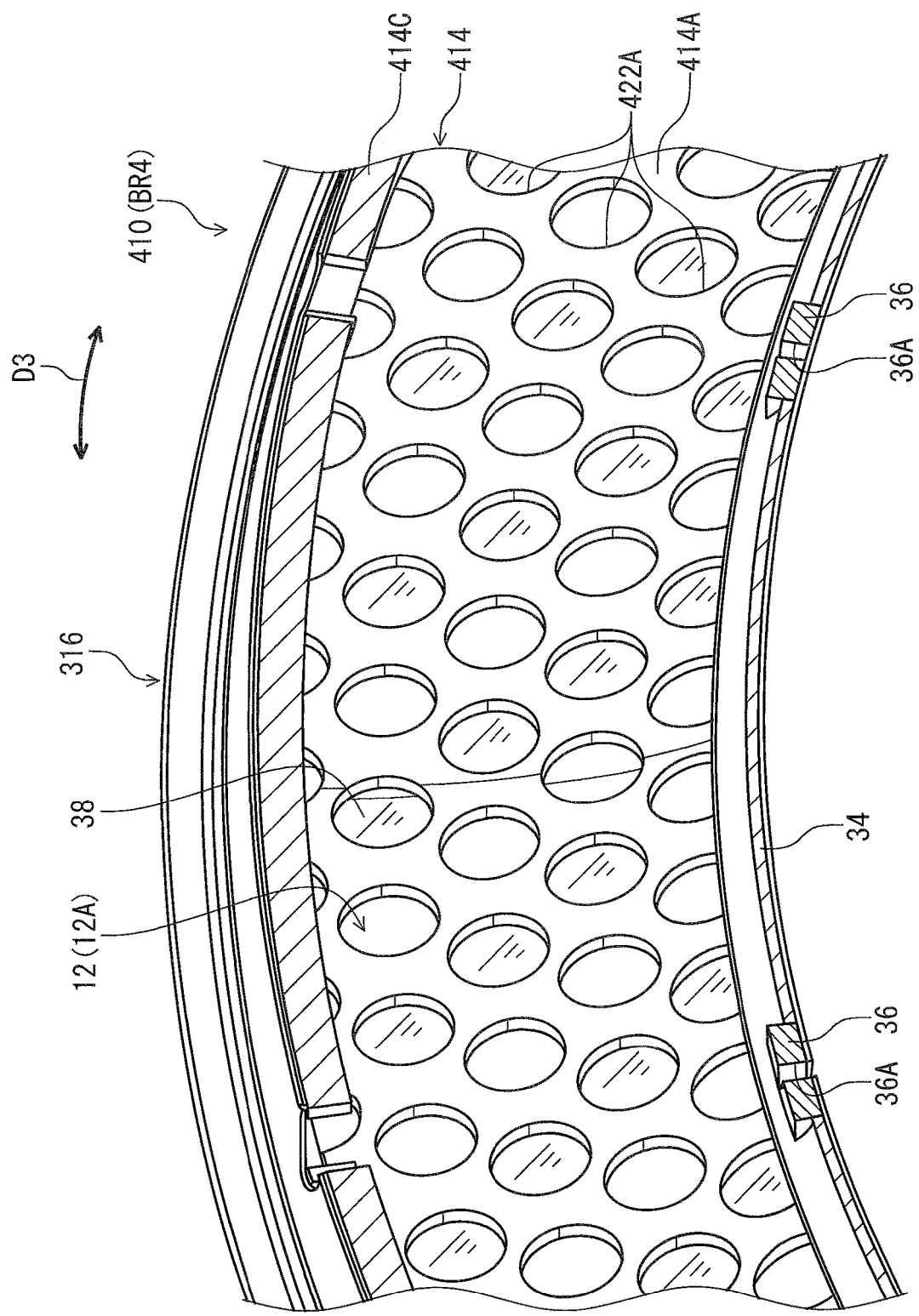
FIG. 31 is a partial perspective cross-sectional view of the bicycle component taken along with line XXXI-XXXI of FIG. 29.
Figure 32:
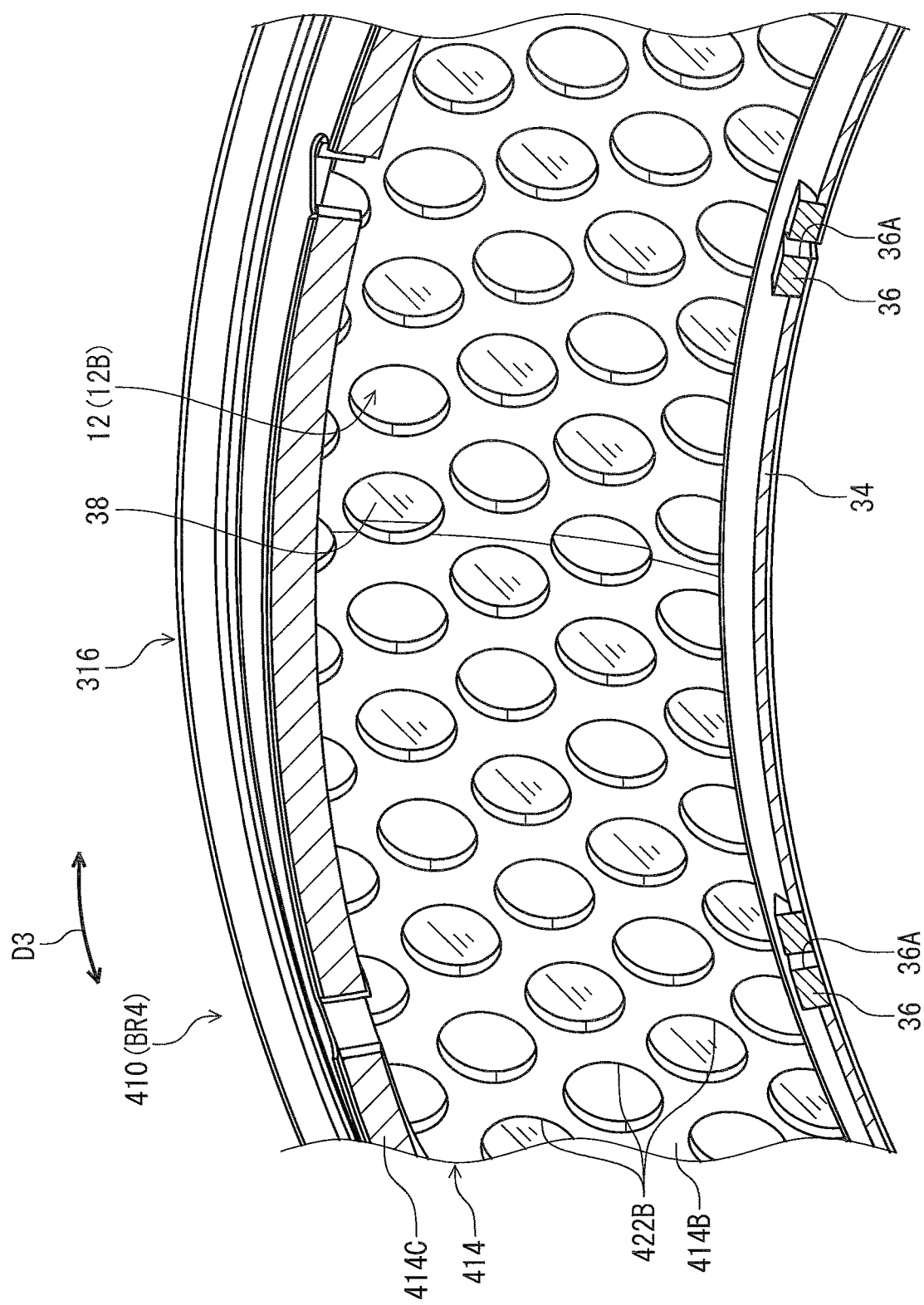
FIG. 32 is another partial perspective cross-sectional view of the bicycle component taken along with line XXXII-XXXII of FIG. 29.

As seen in FIGS. 31 and 32, the first reinforcement part 414A includes a plurality of openings 422A. The second reinforcement part 414B includes a plurality of openings 422B. The cover member 12 at least partly covers the at least one opening 422A and 422B of the base member 414. The cover member 12 entirely covers the at least one opening 422A and 422B of the base member 414. The cover member 12 at least partly covers the plurality of opening 422A and 422B of the base member 414. The cover member 12 entirely covers the plurality of openings 422A and 422B of the base member 414. The openings 422A and 422B are at least partly provided radially outward of the spoke attachment member 36.

As seen in FIG. 30, the adhesive 440A is provided between the first reinforcement part 414A and the electrical insulation layer 38 in the axial direction D1 with respect to the rotational center axis A1 of the bicycle rim BR4 to adhere the first reinforcement part 414A to the electrical insulation layer 38. The first reinforcement part 414A is made of a first material different from a material of the adhesive 440A. In this embodiment, the first material of the first reinforcement part 414A includes fiber reinforced plastic such as glass fiber reinforced plastic and carbon fiber reinforced plastic. The material of the adhesive 440A includes a resin material such as epoxy resin, preferably foaming epoxy resin.

The adhesive 440B is provided between the second reinforcement part 414B and the electrical insulation layer 38 in the axial direction D1 to adhere the second reinforcement part 414B to the electrical insulation layer 38. The second reinforcement part 414B is made of a second material different from a material of the adhesive 440B. In this embodiment, the second material of the second reinforcement part 414B includes fiber reinforced plastic such as glass fiber reinforced plastic and carbon fiber reinforced plastic.

In this embodiment, the second material of the second reinforcement part 414B is the same as the first material of the first reinforcement part 414A. The material of the adhesive 440B is the same as the material of the adhesive 440A. However, the second material of the second reinforcement part 414B can be different from the first material of the first reinforcement part 414A. The material of the adhesive 440B can be different from the material of the adhesive 440A. The third reinforcement part 414C is made of a third material. The third material includes a metallic material such as magnesium. However, the third material of the third reinforcement part 414C is not limited to this embodiment.

In this embodiment, each of the first reinforcement part 414A and the second reinforcement part 414B is integrally provided as a one-piece unitary part. However, the first reinforcement part 414A can include a plurality of portions such as a plurality of layers. The second reinforcement part 414B can include a plurality of portions such as a plurality of layers. Furthermore, each of the first reinforcement part 414A and the second reinforcement part 414B has an annular shape. However, each of the first reinforcement part 414A and the second reinforcement part 414B can have another shape. For example, each of the first reinforcement part 414A and the second reinforcement part 414B can be divided to a plurality of portions.

Fifth Embodiment

A bicycle component 510 and a bicycle rim BR5 in accordance with a sixth embodiment will be described below referring to FIG. 33. The bicycle component 510 has the same structure and/or configuration as those of the bicycle component 10 except for the second structural member 14. The bicycle rim BR5 has the same structure and/or configuration as those of the bicycle rim BR1 except for the base member 14. Thus, elements having substantially the same function as those in the above embodiments will be numbered the same here, and will not be described and/or illustrated again in detail here for the sake of brevity.

Figure 33:
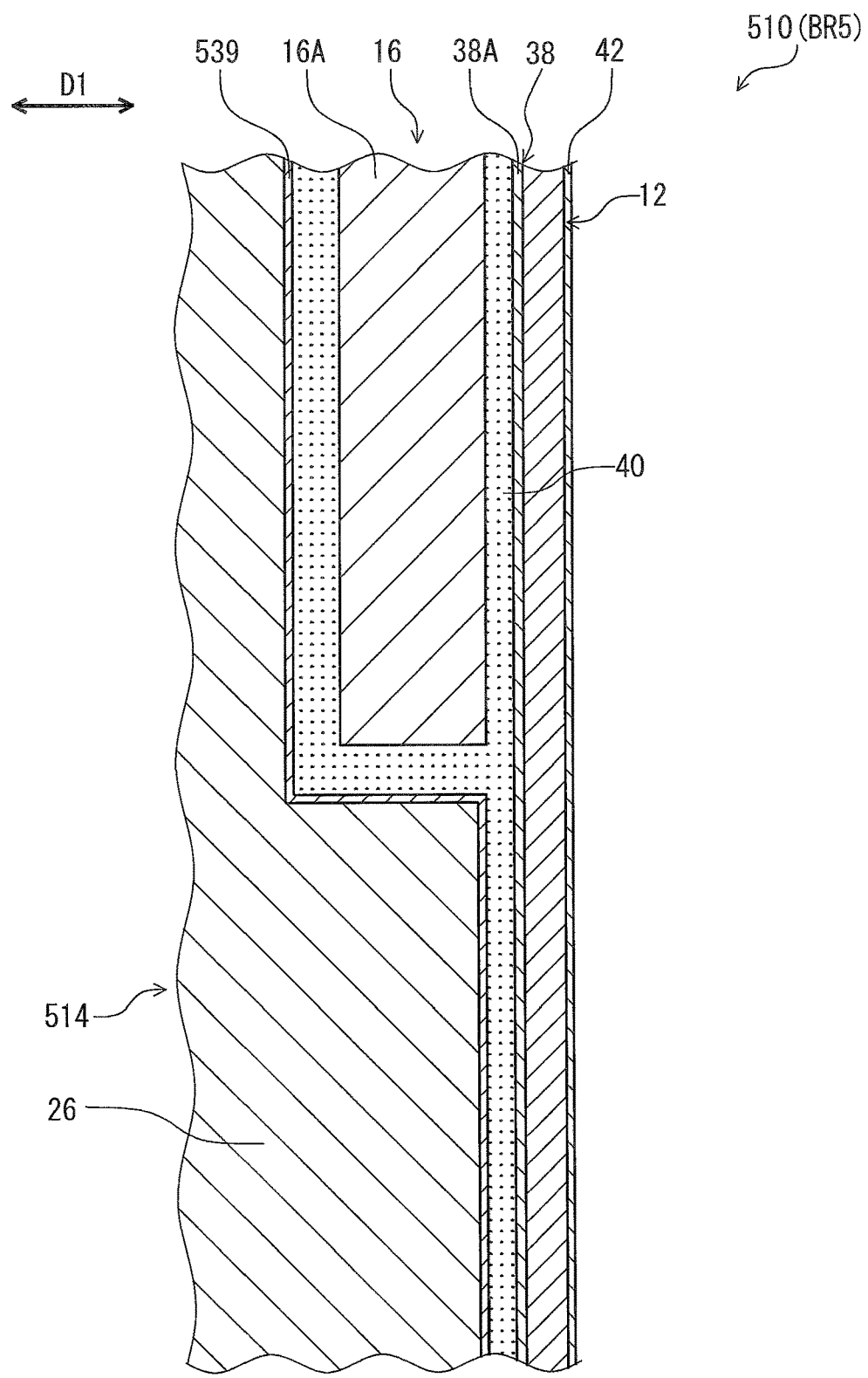
FIG. 33 is a partial enlarged cross-sectional view of a bicycle component in accordance with a fifth embodiment.

As seen in FIG. 33, the bicycle component 510 comprises the first structural member 12, the electrical insulation layer 38, a second structural member 514, and the third structural member 16. Specifically, the bicycle rim BR5 comprises the cover member 12, the electrical insulation layer 38, a base member 514, and the tire-attachment member 16. In this embodiment, the bicycle rim BR5 is a clincher rim. The second structural member (the base member) 514 is configured to be attached to the electrical insulation layer 38 by the adhesive 40.

The bicycle component 510 further comprises an additional electrical insulation layer 539 provided to the second structural member 14. The electrical insulation layer 38 of the first structural member 12 is configured to be attached to the additional electrical insulation layer 539 of the second structural member 514 by the adhesive 40. The second structural member 514 is made of a conducting material. The second structural member (the base member) 514 include a metallic material. For example, the metallic material includes aluminum. The method of forming the additional electrical insulation layer 539 is the same as that of the electrical insulation layer 38 of the first embodiment. Thus, it will not be described in detail here for the sake of brevity.

Sixth Embodiment

A bicycle component 610 and a bicycle rim BR6 in accordance with a seventh embodiment will be described below referring to FIGS. 34 to 40. The bicycle component 610 has the same structure and/or configuration as those of the bicycle component 10 except for the electrical insulation layer 38 and the second structural member 14. The bicycle rim BR6 has the same structure and/or configuration as those of the bicycle rim BR1 except for the electrical insulation layer 38 and the base member 14. Thus, elements having substantially the same function as those in the above embodiments will be numbered the same here, and will not be described and/or illustrated again in detail here for the sake of brevity.

Figure 34:
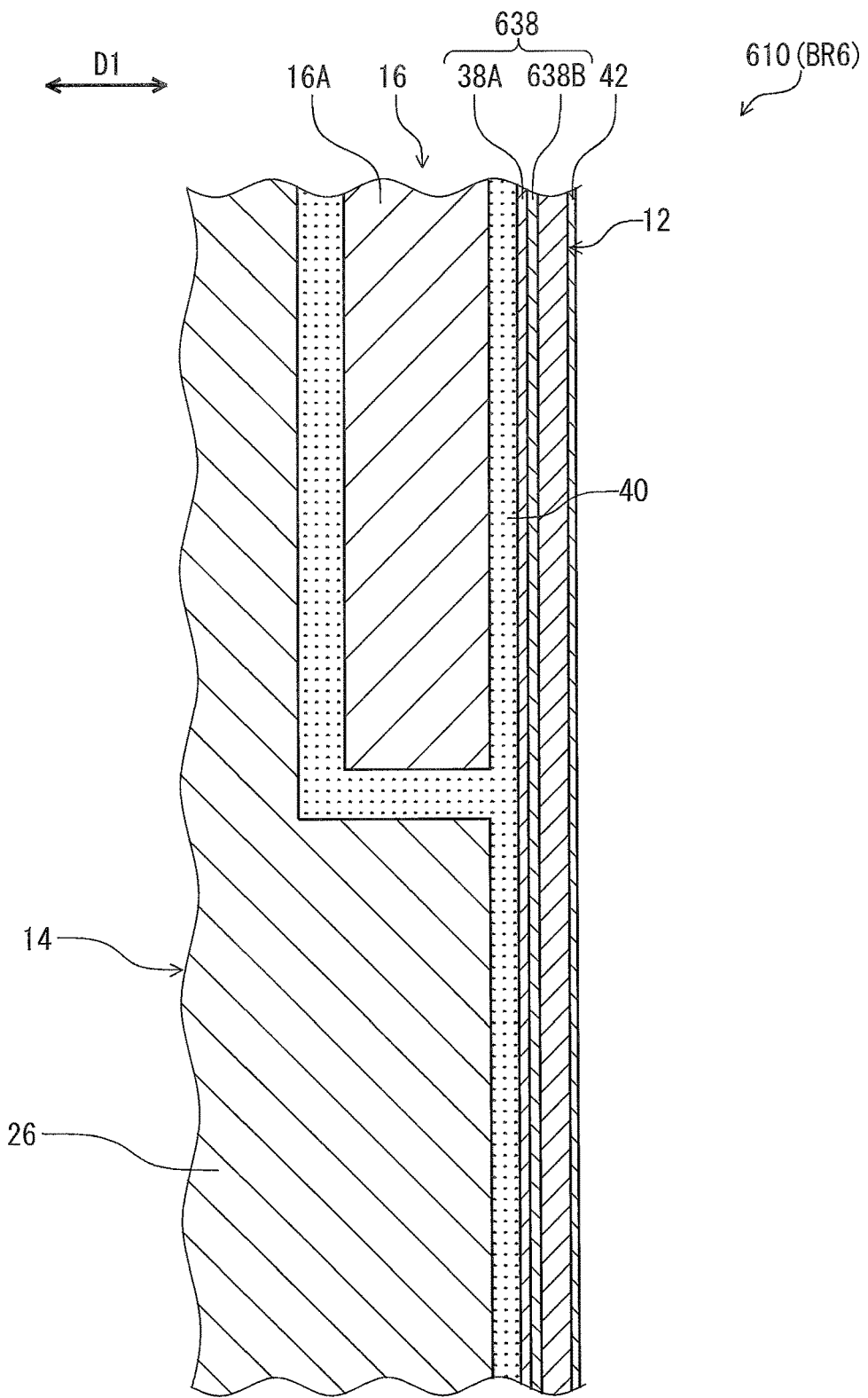
FIG. 34 is a partial enlarged cross-sectional view of a bicycle component in accordance with a sixth embodiment.

As seen in FIG. 34, the bicycle component 610 comprises the first structural member 12, an electrical insulation layer 638, the second structural member 14, and the third structural member 16. Specifically, the bicycle rim BR6 comprises the cover member 12, the electrical insulation layer 638, the base member 14, and the tire-attachment member 16.

The second structural member (the base member) 14 is configured to be attached to the electrical insulation layer 638 by the adhesive 40. The electrical insulation layer 638 includes the electrodeposition coating layer 38A. In this embodiment, the electrical insulation layer 638 includes an anodized oxide layer 638B. The anodized oxide layer 638B is provided between the first structural member 12 and the electrodeposition coating layer 38A.

Figure 35:
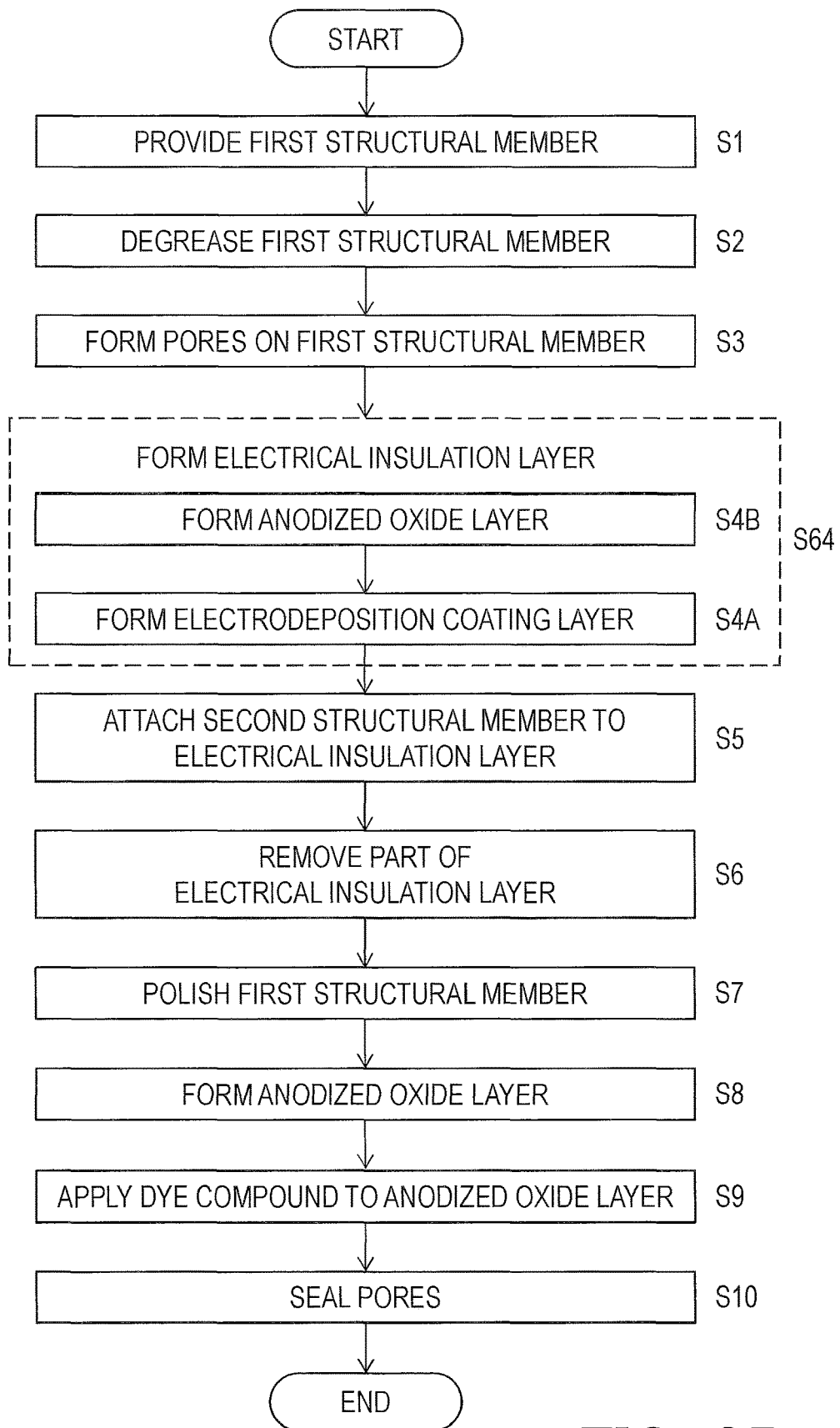
FIG. 35 is a flow chart of a method of manufacturing the bicycle component illustrated in FIG. 34.

As seen in FIG. 35, the method of manufacturing the bicycle component 610 comprises the steps S1 to S3 and S5 to S10 as well as the first embodiment. In this embodiment, the method of manufacturing the bicycle component 610 comprises forming the electrical insulation layer 638 on the first structural member 12 (step S64). The forming of the electrical insulation layer 638 includes forming the anodized oxide layer 638B on the first structural member 12 (step S4B). After forming the anodized oxide layer 638B, the forming the electrical insulation layer 638 includes forming the electrodeposition coating layer 38A on the first structural member 12 with the electrodeposition coating process (step S4A).

Figure 36:
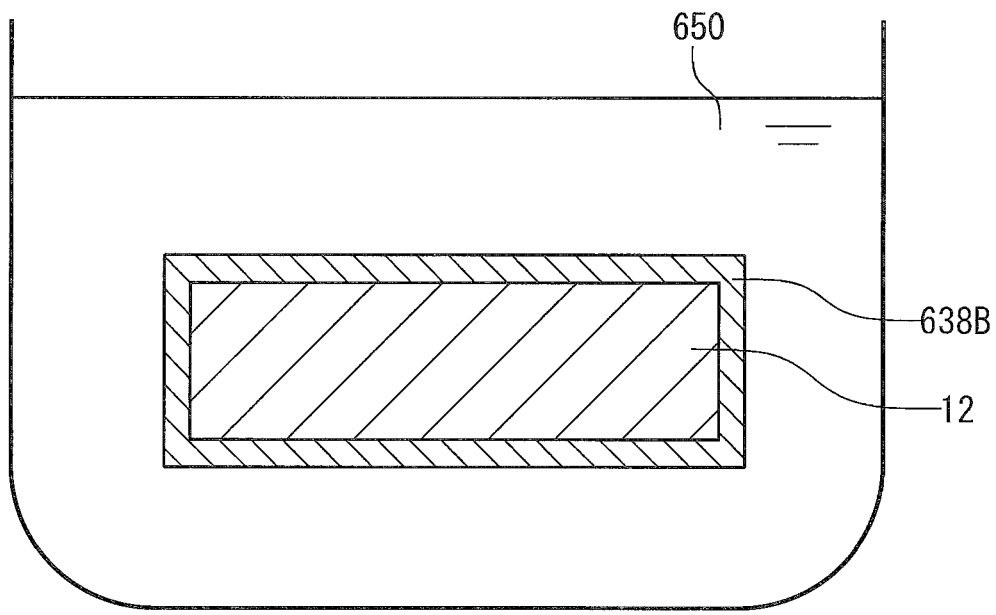
FIGS. 36 to 40 are schematic cross-sectional views showing steps of the method of manufacturing the bicycle component illustrated in FIG. 34.
Figure 37:
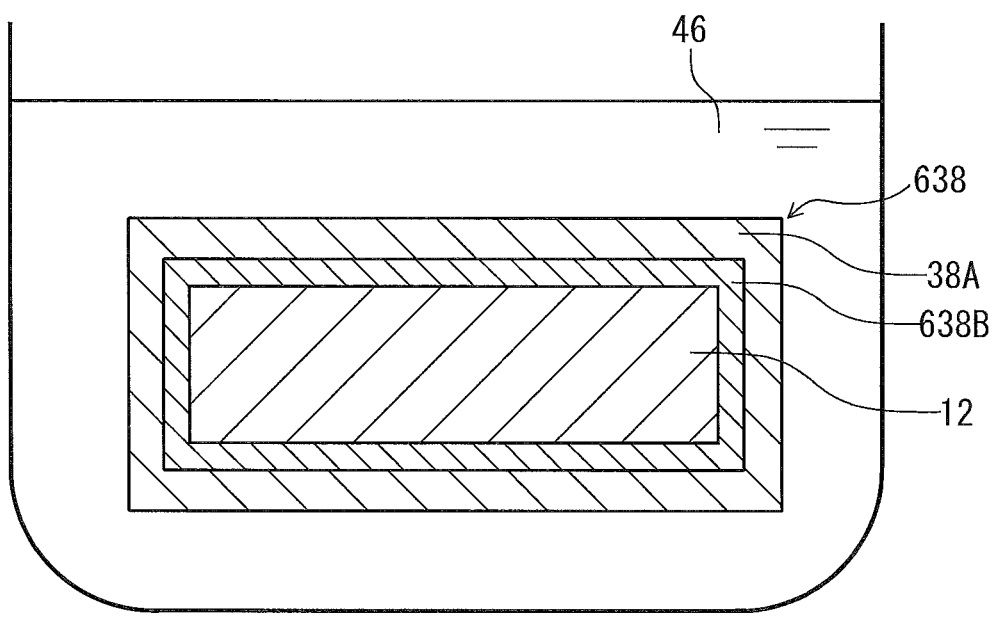

As seen in FIG. 36, the forming of the anodized oxide layer 638B includes putting the first structural member 12 in sulfuric acid 650 having concentration of 15%. The forming of the anodized oxide layer 638B includes applying current density of 1.3 A/dm$^2$ to an anode electrode to anodize the first structural member 12 for approximately 20 minutes under a temperature of approximately 20 degrees Celsius in a state where the first structural member 12 is put in the sulfuric acid 650. As seen in FIG. 37, in the step S4A, the electrodeposition coating layer 38A is formed on the first structural member 12.

Figure 38:
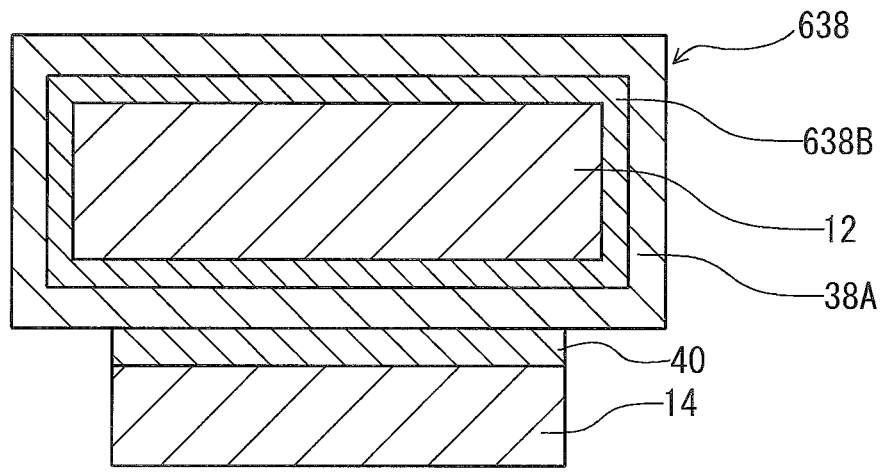
Figure 39:
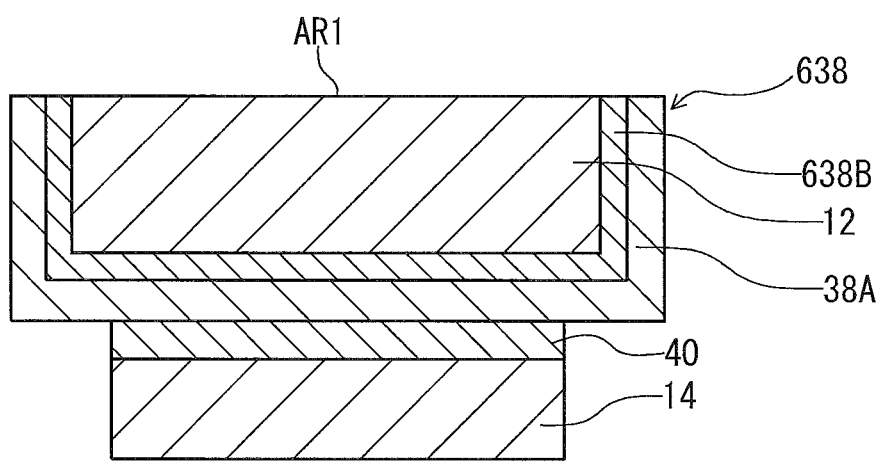
Figure 40:
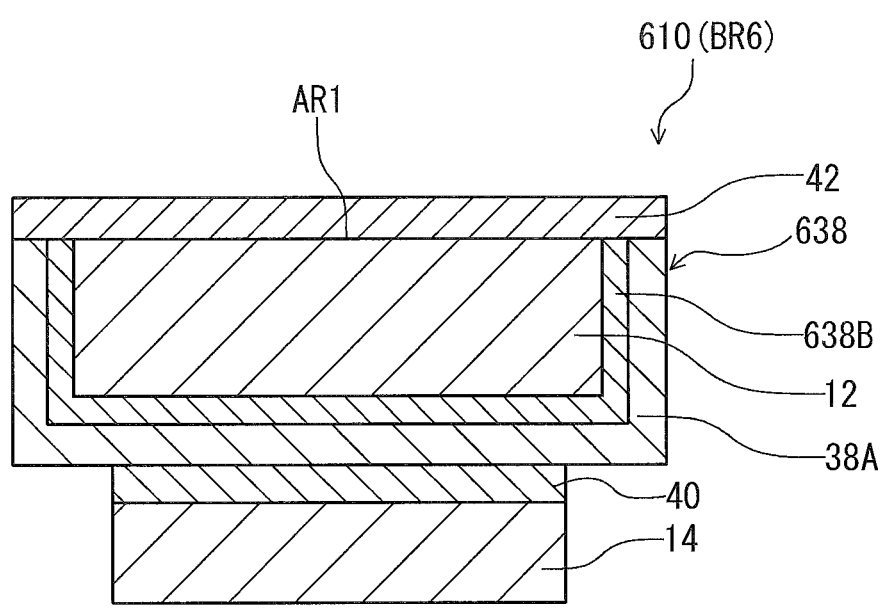

As seen in FIGS. 35 and 38, the method of manufacturing the bicycle component 610 comprises attaching the second structural member 14 to the electrical insulation layer 638 (step S5) by the adhesive 40. As seen in FIGS. 35 and 39, the method of manufacturing the bicycle component 610 comprises removing part of the electrical insulation layer 638 from the first structural member 12 (step S6). As seen in FIG. 35, the method of manufacturing the bicycle component 610 comprises polishing the first structural member 12 in the area AR1 where the part of the electrical insulation layer 638 has been removed (step S7). As seen in FIGS. 35 and 40, the method of manufacturing the bicycle component 610 comprises forming the anodized oxide layer 42 on the first structural member 12 (step S8). In this process, the electrical insulation layer 638 (the electrodeposition coating layer 38A and the anodized oxide layer 638B) insulates between the first structural member 12 and the second structural member 14. Thus, the anodized oxide layer 42 can be stably formed on the area AR1 of the first structural member 12. The method of manufacturing the bicycle component 610 comprises applying dye compound to the anodized oxide layer 42 (step S9). As seen in FIG. 35, the method of manufacturing the bicycle component 610 comprises sealing the pores with a sealing layer to fix the dye compound in the anodized oxide layer 42 (step S10).

Seventh Embodiment

A bicycle component 710 and a bicycle rim BR7 in accordance with an eighth embodiment will be described below referring to FIGS. 41 to 43. The bicycle component 710 has the same structure and/or configuration as those of the bicycle component 10 except for the electrical insulation layer 38 and the second structural member 14. The bicycle rim BR7 has the same structure and/or configuration as those of the bicycle rim BR1 except for the electrical insulation layer 38 and the base member 14. Thus, elements having substantially the same function as those in the above embodiments will be numbered the same here, and will not be described and/or illustrated again in detail here for the sake of brevity.

Figure 41:
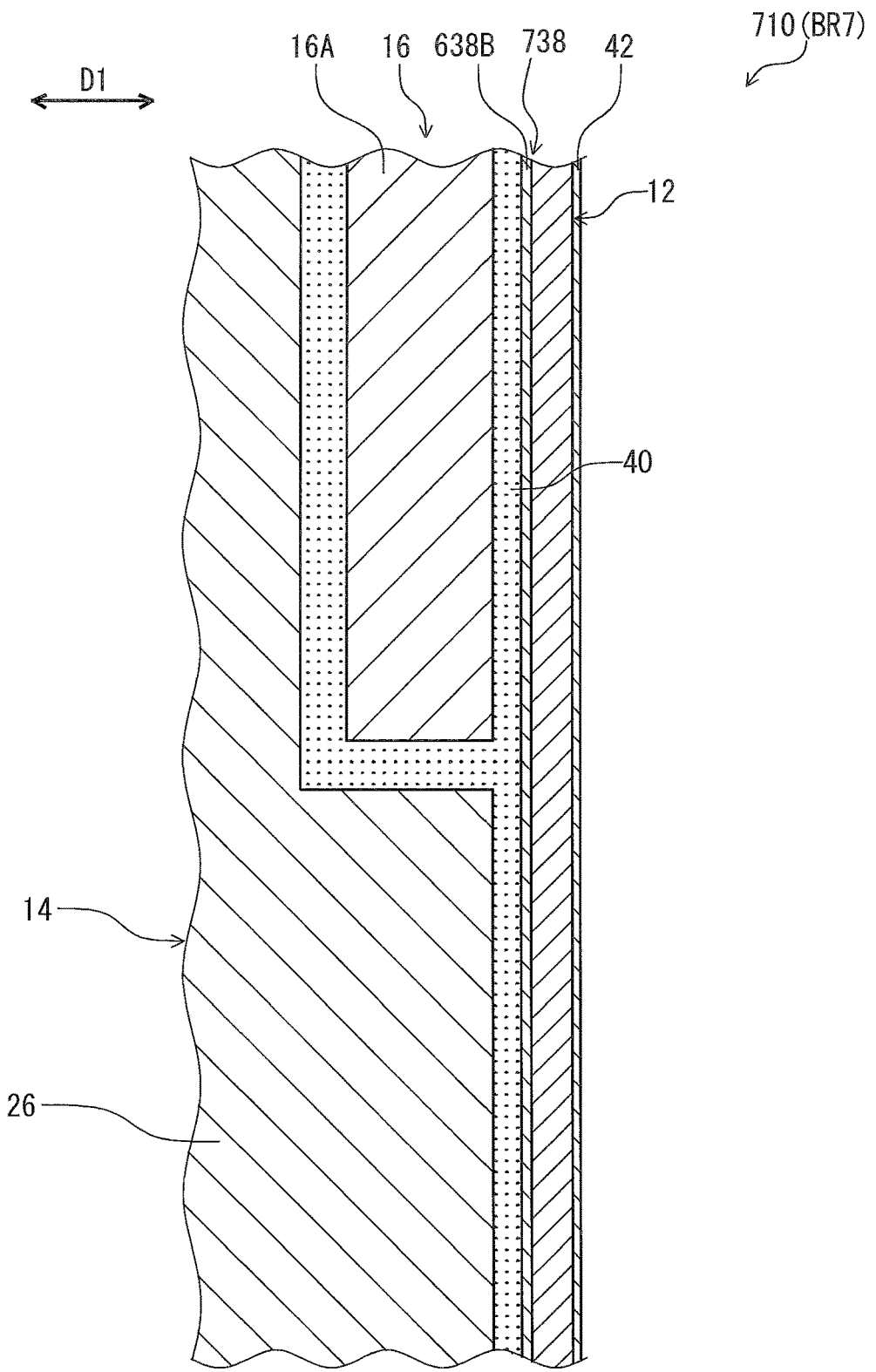
FIG. 41 is a partial enlarged cross-sectional view of a bicycle component in accordance with a seventh embodiment.

As seen in FIG. 41, the bicycle component 710 comprises the first structural member 12, an electrical insulation layer 738, the second structural member 14, and the third structural member 16. Specifically, the bicycle rim BR7 comprises the cover member 12, the electrical insulation layer 738, the base member 14, and the tire-attachment member 16.

The second structural member (the base member) 14 is configured to be attached to the electrical insulation layer 738 by the adhesive 40. The electrical insulation layer 738 includes the electrodeposition coating layer 38A. In this embodiment, the electrical insulation layer 738 includes the anodized oxide layer 638B. The anodized oxide layer 638B is provided between the first structural member 12 and the electrical insulation layer 738. In this embodiment, the thickness of the anodized oxide layer 638B is larger than the thickness of the anodized oxide layer 42. Preferably, the thickness of the anodized oxide layer 638B is equal to or larger than 10 μm.

Figure 42:
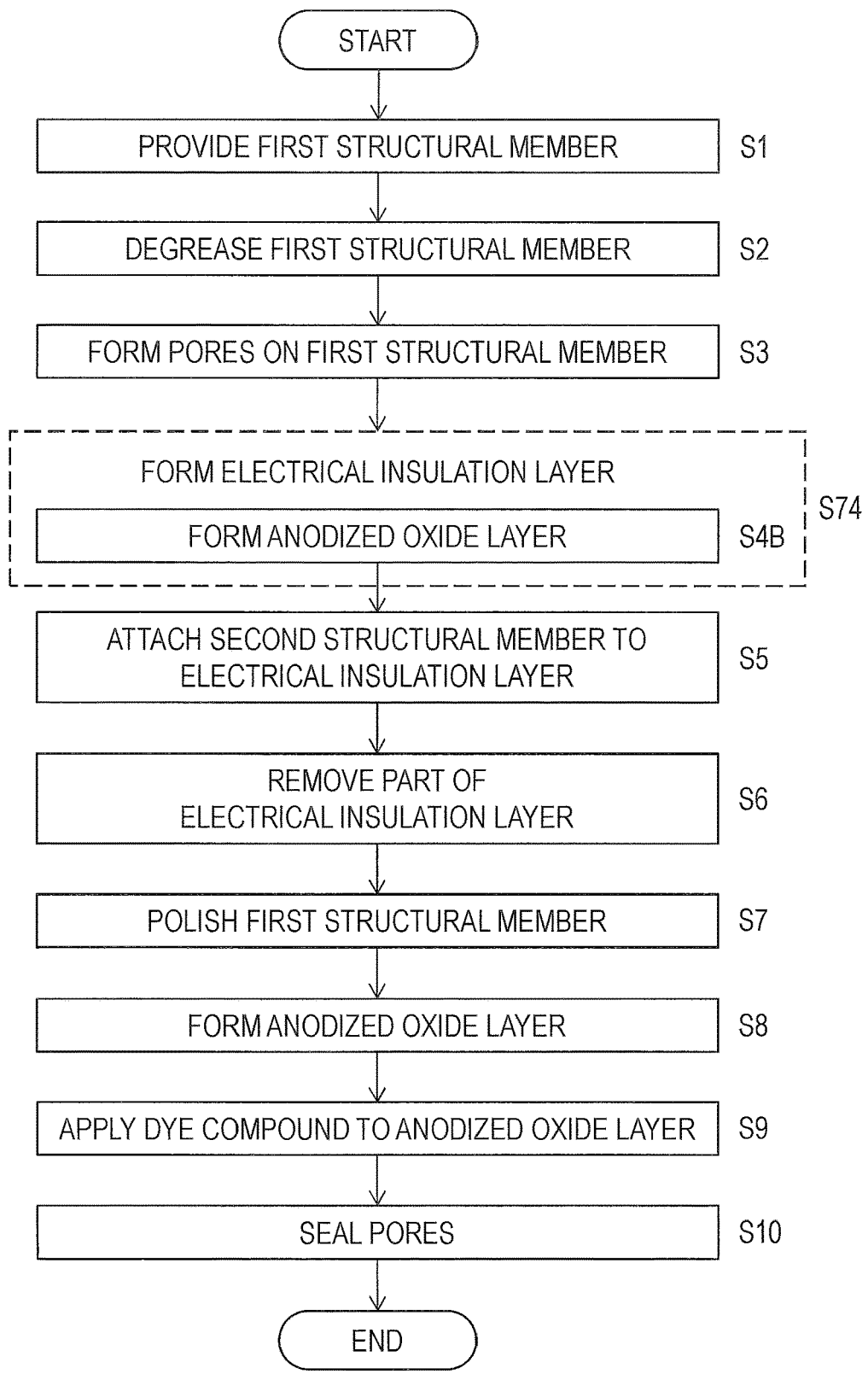
FIG. 42 is a flow chart of a method of manufacturing the bicycle component illustrated in FIG. 41.
Figure 43:
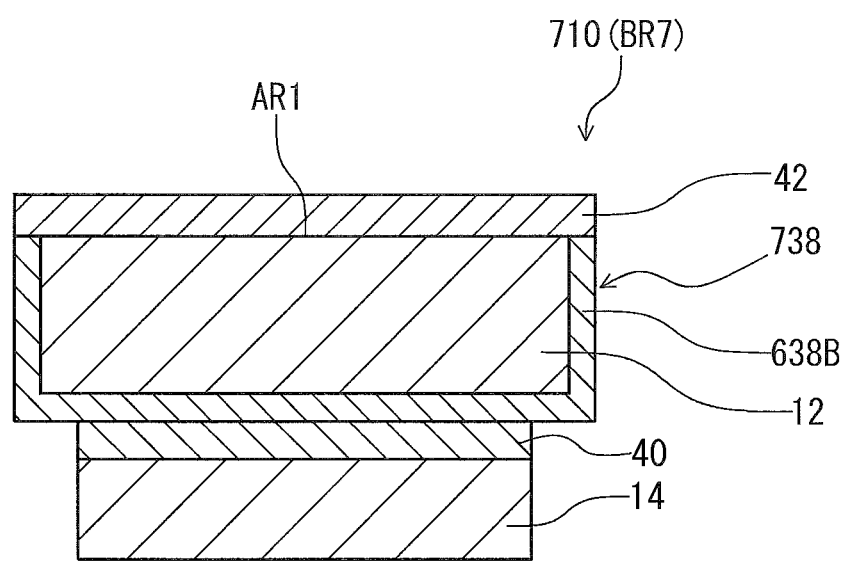
FIG. 43 is a schematic cross-sectional view showing a step of the method of manufacturing the bicycle component illustrated in FIG. 41.

As seen in FIG. 42, the method of manufacturing the bicycle component 710 comprises the steps S1 to S3 and S5 to S10 as well as the first embodiment. In this embodiment, the method of manufacturing the bicycle component 710 comprises forming the electrical insulation layer 738 on the first structural member 12 (step S74). The forming of the electrical insulation layer 738 includes forming the anodized oxide layer 638B on the first structural member 12 (step S4B). However, the forming of the electrodeposition coating layer 38A is omitted from this method. As seen in FIG. 43, in the step S8, the electrical insulation layer 738 (the anodized oxide layer 638B) effectively insulates between the first structural member 12 and the second structural member 14 because the thickness of the anodized oxide layer 638B is equal to or larger than 10 μm. Thus, the anodized oxide layer 42 can be stably formed on the area AR1 of the first structural member 12. The steps S1 to S10 of FIG. 42 are substantially the same as the steps S1 to S10 of FIG. 35 except for the step S4A. Thus, they will not be described in detail here for the sake of brevity.

Modifications

The structure of the bicycle component (the bicycle rim) in each of the above embodiments can apply to any type of bicycle rim such as a clincher rim and a tubular rim.

The above embodiments can be at least partly combined with each other. For example, the second structural member 414 of the fourth embodiment can apply to the bicycle components of the other embodiments. The second structural member 514 of the fifth embodiment can apply to the bicycle components of the other embodiments. The electrical insulation layer 638 of the sixth embodiment can apply to the bicycle components of the other embodiments. The electrical insulation layer 738 of the seventh embodiment can apply to the bicycle components of the other embodiments.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle component comprising:
    a first structural member made of a conducting material;
    an electrical insulation layer provided to the first structural member; and
    a second structural member is attached to the electrical insulation layer by adhesive, wherein
    the electrical insulation layer is provided between the first structural member and the second structural member.

2. The bicycle component according to claim 1, wherein the electrical insulation layer includes synthetic resin.

3. The bicycle component according to claim 1, wherein the electrical insulation layer includes an electrodeposition coating layer.

4. The bicycle component according to claim 1, wherein the first structural member includes a metallic material.

5. The bicycle component according to claim 4, wherein the metallic material includes aluminum.

6. The bicycle component according to claim 5, wherein the first structural member includes an anodized oxide layer.

7. The bicycle component according to claim 1, wherein the second structural member includes a non-metallic material.

8. The bicycle component according to claim 7, wherein the non-metallic material includes carbon fiber reinforced plastic.

9. The bicycle component according to claim 1, further comprising
an additional electrical insulation layer provided to the second structural member, wherein
the electrical insulation layer of the first structural member is attached to the additional electrical insulation layer of the second structural member by the adhesive.

10. The bicycle component according to claim 9, wherein the second structural member is made of a conducting material.

11. The bicycle component according to claim 1, wherein the bicycle component includes a bicycle rim.

12. A bicycle rim comprising:
a cover member made of a conducting material;
an electrical insulation layer provided to the cover member; and
a base member is attached to the electrical insulation layer by adhesive, wherein
the electrical insulation layer is provided between the cover member and the base member.

13. The bicycle rim according to claim 12, wherein the electrical insulation layer includes synthetic resin.

14. The bicycle rim according to claim 12, wherein the electrical insulation layer includes an electrodeposition coating layer.

15. The bicycle rim according to claim 12, further comprising
a spoke attachment member that is a separate member from the base member and the cover member.

16. The bicycle rim according to claim 12, wherein the cover member includes a metallic material.

17. The bicycle rim according to claim 16, wherein the metallic material includes aluminum.

18. The bicycle rim according to claim 17, wherein the cover member includes an anodized oxide layer.

19. The bicycle rim according to claim 12, wherein the base member includes a non-metallic material.

20. The bicycle rim according to claim 19, wherein the non-metallic material includes carbon fiber reinforced plastic.

21. The bicycle rim according to claim 12, wherein
the base member includes a truss structure defining at least one opening, and
the cover member at least partly covers the at least one opening of the base member.

22. The bicycle rim according to claim 21, wherein the truss structure includes at least one slanting member extending to intersect with a radial direction with respect to a rotational center axis of the bicycle rim.

23. The bicycle rim according to claim 21, wherein the truss structure includes at least one radially extending member radially extending along a radial direction with respect to a rotational center axis of the bicycle rim.

24. The bicycle rim according to claim 21, wherein the truss structure includes a plurality of slanting members extending to intersect with a radial direction with respect to a rotational center axis of the bicycle rim.

25. The bicycle rim according to claim 21, wherein the truss structure includes a plurality of radially extending members radially extending along a radial direction with respect to a rotational center axis of the bicycle rim.

26. The bicycle rim according to claim 21, wherein
the truss structure defines a plurality of openings, and
the cover member at least partly covers the plurality of opening of the base member.

27. The bicycle rim according to claim 21, wherein the cover member entirely covers the at least one opening of the base member.

28. The bicycle rim according to claim 26, wherein the cover member entirely covers the plurality of openings of the base member.

* * * * *